(12) United States Patent
Hamada et al.

(10) Patent No.: US 6,182,278 B1
(45) Date of Patent: *Jan. 30, 2001

(54) PROGRAM DEVELOPMENT SUPPORT SYSTEM AND SUPPORT METHOD AND STORAGE MEDIUM FOR STORING PROGRAM COMPONENTS WHICH ARE USED FOR PROGRAM DEVELOPMENT SUPPORT

(75) Inventors: Seiji Hamada; Yuichi Nakamura, both of Yokohama; Kazuya Tago, Yamato, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/814,427

(22) Filed: Mar. 10, 1997

(30) Foreign Application Priority Data

Jul. 2, 1996 (JP) .................................................... 8-171998

(51) Int. Cl.⁷ ...................................................... G06F 9/45
(52) U.S. Cl. .................................. 717/2; 717/1; 345/339; 345/967
(58) Field of Search ...................................... 395/701, 702, 395/703; 345/339, 356, 967; 717/1, 2, 3

(56) References Cited

U.S. PATENT DOCUMENTS

| | | | |
|---|---|---|---|
| 5,293,478 | * | 3/1994 | Yamamoto et al. .................. 345/338 |
| 5,367,622 | * | 11/1994 | Coggins ............................... 345/356 |
| 5,487,141 | * | 1/1996 | Cain et al. ........................... 345/435 |
| 5,537,630 | * | 7/1996 | Berry et al. ........................ 345/326 |
| 5,600,778 | * | 2/1997 | Swanson et al. .................... 345/333 |
| 5,651,108 | * | 7/1997 | Cain et al. ........................... 345/340 |
| 5,710,920 | * | 1/1998 | Maruyama et al. ................. 707/103 |
| 5,710,926 | * | 1/1998 | Maurer ................................. 395/701 |
| 5,758,160 | * | 5/1998 | McInerney et al. ................. 395/701 |
| 5,778,227 | * | 7/1998 | Jordan ................................. 395/682 |
| 5,850,548 | * | 12/1998 | Williams ............................. 395/701 |
| 5,862,372 | * | 1/1999 | Morris et al. ....................... 395/701 |
| 5,878,260 | * | 3/1999 | Copeland et al. ................... 395/702 |
| 5,950,001 | * | 9/1999 | Hamilton et al. ................... 395/701 |

OTHER PUBLICATIONS

Burnett, M., Goldberg, A., Lewis, T., editors "Visual Object–Oriented Programming: Concepts and Environments"; Manning Publications Co.; pp. 185–267, Oct., 1995.12*

(List continued on next page.)

Primary Examiner—Kakali Chaki
(74) Attorney, Agent, or Firm—Scully, Scott, Murphy, & Presser; Marian Underweiser, Esq.

(57) ABSTRACT

The present invention is directed to making a variety of programming operations, which a programmer desires, possible by using a program component. More specifically, an apparent function of program component 131 is extended by component-information editor 101 which updates the information of component-information storage 110 that holds the information about the property and method of the program component. The component information is utilized both when an application program is developed and when the application program is executed. When a program is developed, the component information is utilized by property editor 103 and code editor 107. Therefore, users can utilize the component information for generating a programming code with a feeling as if the function of the program component were extended. Furthermore, there is no possibility that the user will be conscious of the difference between the existent function and the extended function of the program component. When, on the other hand, a program is executed, the component information is utilized to call out program component 131 from interpreter 120, so the extended function can be suitably executed.

4 Claims, 21 Drawing Sheets

OTHER PUBLICATIONS

"Components Let Developers Drive Applications Out the Door Faster"; InfoWorld; Apr. 29, 1996, pp. 076. PROMT [online] Retrieved from STN International, Accession No. 96:223325.*

"HP Readies Component Factory"; InformationWeek; Jun. 3, 1996, pp. A15. PROMT [online] Retrieved from STN International, Accession No. 96:275564.*

"Lotus Components: Developing Notes Applications with Lotus Components"; Lotus Development Corporation; pp. 5–28, 31–44, 47–63, 68–84, 93–119, 130–147, 162–163 &180–186, Nov. 1996.*

"Object Pallet for Visual Code Generation"; IBM Technical Disclosure Bulletin; vol. 38, No. 1, p. 19, Jan. 1995.*

Brazile, Robert P., A System for Program Component Specification and Code Generation, Proceedings of the 1992 ACM/SIGAPP Symposium on Applied Computing, vol. II, pp. 904–910.*

* cited by examiner

| Name 155 | Type 156 | Get function 157 | Put function 158 | Flag 159 |
|---|---|---|---|---|
| Width | Integer | GetWidth | PutWidth | 0 |
| Label | String | GetLabel | PutLabel | 0 |
| ... | ... | ... | ... | ... |
| Aaa | Integer | GetPROPERTY | PutPROPERTY | 1 |
| Bbb | String | GetPROPERTY | PutPROPERTY | 1 |
| ... | ... | ... | ... | ... |

151: (Ordinary property)
153: (User-defined property)

Property table 150

| Name 165 | Mounting-function Information 167 | Type 168 | Flag 169 |
|---|---|---|---|
| Move | "Move" address information | x as Integer, y as Integer/- | 0 |
| Rename | "Rename" address information | a as String/- | 0 |
| GetStatus | "GetStatus" address information | -/Return Code as Integer | 0 |
| ... | ... | ... | ... |
| Xxx | "CallMethod" address information | a as Integer | 1 |
| Yyy | "CallMethod" address information | a as String | 1 |
| ... | ... | ... | ... |

Method table 160

{ 161 (rows Move, Rename, GetStatus)
{ 163 (rows Xxx, Yyy)

| Name 175 | Type 176 | Get function 177 | Put function 178 | Value 179 |
|---|---|---|---|---|
| Width | Integer | GetWidth | PutWidth | Value |
| Label | String | GetLabel | PutLabel | Value |
| ⋮ | ⋮ | ⋮ | ⋮ | ⋮ |

Components property information 171

| Name 175 | Type 177 | Value 179 |
|---|---|---|
| Aaa | Integer | Value |
| Bbb | String | Value |
| ⋮ | ⋮ | ⋮ |

173 { (bracketing the data rows)

Components property table 173

Fig. 6

| Name 185 | Mounting function 187 | Type 188 |
|---|---|---|
| Move  Rename  GetStatus  • • | "Move" address information "Rename" address information "GetStatus" address information • • | x as Integer, y as integer/-  a as String/-  -/ReturnCode as Integer  • • |

Components method information 180

Method call adapter 137

*Fig. 7*

PROGRAM DEVELOPMENT SUPPORT SYSTEM AND SUPPORT METHOD AND STORAGE MEDIUM FOR STORING PROGRAM COMPONENTS WHICH ARE USED FOR PROGRAM DEVELOPMENT SUPPORT

BACKGROUND OF THE INVENTION

1. Technical Field

The present invention relates to a method and system for supporting the generation of a program, and componenticularly to a method of integrating program components into a program construction (development) support system. More specifically, the invention relates to a method which integrates program components, adding a new function to the function that the program component inherently has.

2. Prior Art

When a programmer generates an application program by an interactive program generation support system, such as Visual Basic (trademark of Microsoft), the system provides program components to support the generation. FIGS. 13, 14 are diagrams showing the form of utilization of conventional program components.

In the aforementioned example as FIG. 13, there is provided a program component 230 constituted by a button icon 203. The example includes variable information (x, y) to define a position at which a button icon is displayed and variable information (w, h) to define the width and height of a button icon, as property 231, and further includes information about "move(x, y)" which indicates that the button icon is moved to a specified position of (x, y) and information about "resize(w, h)" which changes the button icon to a specified size of (w, h), as method 233.

If the aforementioned program component is positioned on an application window 320 and a value of the property is set by a property editor described later, an interpreter will interpret the two pieces of information and a button icon will be displayed according to the property value set on the application window 320.

However, in the program components provided in the conventional technique, the properties and methods are previously given and usable properties and methods are limited. The conventional technique, therefore, cannot meet a variety of programmer's demands, such as "Wanting to attach a plurality of labels to a button component (in a conventional program support system, only a single label is usually given to one button of program components)" and "Wanting to change the size of a button in correspondence with the number of characters of a label that is attached to the button (in a conventional program support system, normally the button size is defined by a fixed value but cannot be defined by a function value)." Thus, there are a great number of limitations on the programming operation using program components.

The conventional program component is provided only to a graphical object which is visually displayed as a graphic figure, such as a button icon and a ruler bar, but it is not provided to a non-graphical object which is described by using characters and symbols by a code editor described later. For this reason, the programmer needs to make a program by uniting and describing a plurality of instructions constituted by a programming language which performs a coding operation. In addition, when making another program, such description cannot be reused, so there is the need to perform nearly the same coding operation again.

Even in the coding operation using subroutines, the management of the characteristic variables of an object becomes complicated and the reutilization is not easy, because each subroutine cannot hold a state as does a program component.

In connection with the aforementioned problems, Published Unexamined Patent Application No. 7-28636 has proposed a graphical user interface construction support system, using a table where an input operation and a visual object are correlated. However, since the graphical user interface construction support system presents a candidate for a visual object in order of the higher degree of compatibility to the input operation in order to indicate what degree the visual object in the application program corresponding to each input operation of a user is compatible with the input operation, the selection of program components can be performed quickly, but the function itself of program components cannot be extended.

Also, Published Unexamined Patent Application No. 7-219753 has proposed an interactive program development support system which enhances development efficiency by using, as a resource, component of a callback function which instructs an operation that executes an event generated when a button icon is depressed with the pointer of a pointing device. This support system can change the content of a process that is executed by the method, but it cannot add a new method. Therefore, the system cannot meet a variety of programmer's demands such as "Wanting to change the size of a button in correspondence with the number of characters of a label that is attached to the button."

Furthermore, Published Unexamined Patent Application No. 4-353926 has proposed a system where an interactive component-defining body input operation and a visual object are correlated with a table. However, in this system a method is previously correlated with the interactive component and the method is customized, so the method desired by the user cannot be added to the interactive component. This system, therefore, cannot satisfy a variety of programmer's demands, such as "Wanting to attach a plurality of labels" and "Wanting to change the size of a button in correspondence with the number of characters of a label that is attached to the button" and also the system cannot define a non-graphical object as a program component.

SUMMARY OF THE INVENTION

An objective of the present invention is for the component-information storage to utilize a program component in order to realize a variety of programming operations that a programmer desires, which could not be realized by a conventional program component, by accumulating not only information about the original function of the program component but also information about a new function which is not present in an actual component in such a manner that a program builder and an interpreter can utilize the two pieces of information.

Another objective of the present invention is to make it possible to change both the original property of a program component and an additional property by a property editor without making a distinction between them.

Still another objective of the present invention is to make it possible to utilize an additional method and an additional property by a program builder and an interpreter without distinguishing them from the original method and property of a program component.

An application program support system of the present invention has a component-information storage which holds information about program components. By updating this information, an apparent function is extended without extending the actual function of the program component. Updating of the component information is performed so that a new property and method can be added to the component, and an edit operation such as this is performed by a component-information editor. The component information is utilized both when an application program is developed and when an application program is executed. More specifically, when a program is developed, the component information is utilized by a property editor and a code editor. With this, the user can utilize the component information for generating a programming code with a feeling as if the function of the component were extended. Furthermore, there is no possibility that the user will be conscious of the difference between the original function of a normal program component (which is not a program component defined by the user but a program component with a fixed function) and the extended function. When, on the other hand, a program is executed, the component information is utilized to call out a program component from an interpreter and the extended function can be suitably executed.

BRIEF DESCRIPTION OF THE DRAWINGS

Preferred embodiments of the present invention will now be described, by way of example only, with reference to the accompanying drawings, in which;

FIG. 4 is a diagram showing the property table of a component-information storage in a preferred embodiment of the present invention;

FIG. 5 is a diagram showing the method table of the component-information storage in a preferred embodiment of the present invention;

FIG. 6 is a diagram showing the property table of a program component in a preferred embodiment of the present invention;

FIG. 7 is a diagram showing the method table of the program component in a preferred embodiment of the present invention;

DETAILED DESCRIPTION OF THE PREFERRED EMBODIMENTS OF THE INVENTION

Figure 1:
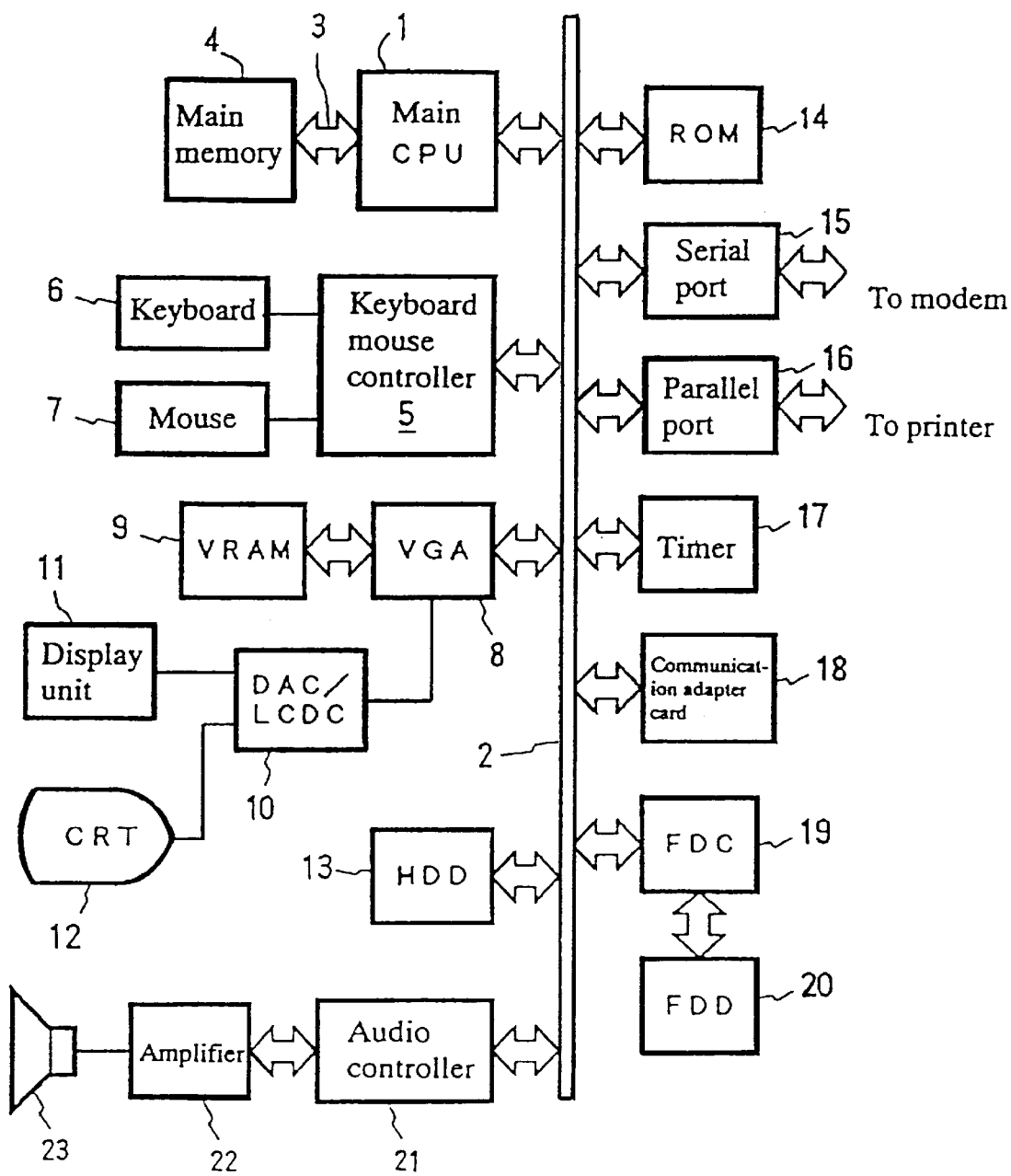
FIG. 1 is a block diagram showing an embodiment of hardware structure.

In a preferred form of the present invention, there is provided a data processing system which comprises: a program component including a component-property table which manages the user-defined property name and user-defined property value of a user-defined property and also including a method call adapter which points to the code of a user-defined method by receiving a user-defined method name and a generic method function; a component-information storage having a program component name, a property table which manages a user-defined property name and a generic property access function, and a method table which manages a user-defined method name and a generic method function; a component editor for registering the user-defined property name of the property table and the user-defined method name of the method table; a property editor for updating the user-defined property value of the program component; a code editor for editing a method code which specifies the content of execute of a method and also editing a main logic having specification of a component name, a property name, and a method name; a code storage for storing the method code edited by the code editor so that the method code can be specified with the component name and the method name and also storing the main logic; and a code executor receiving the main logic stored in the code storage, specifying the generic property access function managed by the property table of the component-information storage from the component name and property name included in the main logic, issuing the user-defined property name and the generic property access function to the program component, specifying the generic method function managed by the method table of the component-information storage from the component name and method name included in the main logic, and issuing the user-defined method name and the generic method function to the program component.

In another preferred form of the present invention, there is provided a program development support system which comprises: a program component including a component-property table which manages the user-defined property name and user-defined property value of a user-defined property; a component-information storage provided with a property table which manages a user-defined property name for having access to the user-defined property value of the program component and also manages a generic property access function; and a component editor for registering the user-defined property name of the property table and the user-defined property name of the component-property table.

In still another preferred form of the present invention, there is provided a system which comprises: a program component including a method call adapter which points to the code of a user-defined method by receiving a user-defined method name and a generic method function; a component-information storage provided with a method table which manages a program component name, a user-defined method name, and a generic method function; a component editor for registering the user-defined method name of the method table; a code editor for editing a method code which specifies the content of execute of a method and also editing a main logic which includes specification of a component name and a method name; a code storage for storing the method code edited by the code editor so that the method code can be specified with the component name and the method name and also storing the main logic; and a code executor receiving the main logic stored in the code storage, specifying the generic method function managed by the method table of the component-information storage from the component name and method name included in the main logic, and issues the user-defined method name and the generic method function to the program component.

In a further preferred form of the present invention, there is provided a method of extending a function of a program component which comprises the steps of: detecting specification of a program component which is performed by a user; displaying a property information entry to input a property name of the specified program component and also displaying a method information entry to input a method name of the specified program component; registering the user-defined property name input to the property information entry in the property table; and registering the user-defined method name input to the method information entry in the method table.

In another preferred form of the present invention, there is provided a method of extending a function of a program component which comprises the steps of: displaying an icon of a new program component representative of a program component for user registration of the new program component onto the display unit; detecting specification of the icon of the new program component which is performed by the user; displaying a program component name input entry to input a program component name of the specified new program component; making a component-property table which has entries of a property name and a property value corresponding to the user-defined program component name input to the program component input entry; displaying a property information entry to input a property name of the specified program component; registering the information input to the property information entry in the component-property table; displaying a property value input entry to input the property value corresponding to the user-defined property name; and registering a value input to the property value input entry in the component-property table. The aforementioned function extending method is used in a data processing system, which includes an input unit, a display unit, a code executor, and a program component that manages a property value which is provided to the code executor.

In another preferred form of the present invention, there is provided a method of extending a function of a program component which comprises the steps of: detecting specification of a program component which is performed by a user; displaying a property information entry to input a property name of the specified program component; relating the user-defined property name input to the property information entry to the specified program component; displaying a property value input entry to input a property value corresponding to the user-defined property name; and relating a value input to the property value input entry to the specified program component. The aforementioned function extending method is used in a data processing system, which includes an input unit, a display unit, a code executor, and a program component that manages a property value which is provided to the code executor.

In another preferred form of the present invention, there is provided a program code executing method which comprises the steps of: receiving a program code which includes a description for specifying the program component name, the property name of the program component, and the method name of the program component; specifying the generic property access function managed in the property table of the component-information storage from the component name and property name included in the program code; specifying the property value of the program component, based on the program component name and on the generic property access function managed in the property table of the component-information storage; specifying the generic method function managed in the method table of the component-information storage from the component name and method name included in the program code; issuing the user-defined method name and the generic method function to the program component; receiving generic method code access information which points to the code of the user-defined method, issued in response to reception of the user-defined method name and the generic method function performed by the program component; accessing the code of the user-defined method stored in the code storage, based on the generic method code access information; and executing the code of the user-defined method.

In another preferred form of the present invention, there is provided a program code executing method which comprises the steps of: receiving a program code which includes a description for specifying the program component name and the property name of the program component; specifying the generic property access function managed in the property table of the component information storage from the component name and property name included in the program code; and specifying the property value of the program component, based on the program component name and on the generic property access function managed in the property table of the component-information storage. The program code executing method is used in a data processing system, which includes a program component which manages property information, a property table which manages a property name and a generic property access function of the program component, a code executor, a code storage which includes description of a program component name and a property name and which stores a program code which is executed by the code executor, and a code editor for editing the code.

In another preferred form of the present invention, there is provided a program code executing method which comprises the steps of: receiving a program code which includes a description for specifying the program component name and the method name of the program component; specifying the generic method function managed in the method table of the component-information storage from the component name and method name included in the program code; issuing the user-defined method name and the generic method function to the program component; receiving generic method code access information which points to the code of the user-defined method, issued in response to reception of the user-defined method name and the generic method function performed by the program component; accessing the code of the user-defined method stored in the code storage, based on the generic method code access information; and executing the code of the user-defined method. The program code executing method is used in a data processing system, which includes a program component which manages method information, a method table which manages a method name and a generic method function of the program component, a code executor, a code storage which includes description of a program component name and a method name and which stores a code of a user-defined method stored in relation to a program code which is executed by the code executor and to a method of the program component, and a code editor for editing the code.

In another preferred form of the present invention, there is provided a storage medium for storing a program component which manages a method and a property that are provided at the time of execute and which is loaded into a program development support system for program development support. The storage medium comprises: a component-property table having entries of a user-defined property name and a user-defined property value of a user-defined property; and a method call adapter which points to a code of the method by receiving a user-defined method name and a generic method function from the program development support system.

In another preferred form of the present invention, there is provided a storage medium for storing a program to extend a function of a program component, which comprises: program code means for instructing a data processing system to detect specification of a program component which is performed by a user; program code means for instructing the data processing system to display a property information entry to input a property name of the specified program component and also display a method information entry to input a method name of the specified program component; program code means for instructing the data processing system to register the user-defined property name input to the property information entry in the property table; and program code means for instructing the data processing system to register the user-defined method name input to the method information entry in the method table.

In another preferred form of the present invention, there is provided a storage medium for storing a program to execute a program code, which comprises: program code means for instructing a data processing system to receive a program code which includes a description for specifying the program component name, the property name of the program component, and the method name of the program component; program code means for instructing the data processing system to specify the generic property access function managed in the property table of the component-information storage from the component name and property name included in the program code; program code means for instructing the data processing system to specify the property value of the program component, based on the program component name and on the generic property access function managed in the property table of the component-information storage; program code means for instructing the data processing system to specify the generic method function managed in the method table of the component-information storage from the component name and method name included in the program code; program code means for instructing the data processing system to issue the user-defined method name and the generic method function to the program component; program code means for instructing the data processing system to receive generic method code access information which points to the code of the user-defined method, issued in response to reception of the user-defined method name and the generic method function performed by the program component; program code means for instructing the data processing system to access the code of the user-defined method stored in the code storage, based on the generic method code access information; and program code means for instructing the data processing system to execute the code of the user-defined method.

A. Hardware Structure

An embodiment of the present invention will hereinafter be described in reference to the drawings. Referring to FIG. 1, there is shown a block diagram of hardware structure used for carrying out the present invention. A system 100 includes a central processing unit (CPU) 1 and a memory 4. The CPU 1 and the memory 4 are connected through a bus 2 to a hard-disk drive 13 used as a secondary storage. A floppy-disk drive (or a drive for a storage medium such as a CD-ROM, an MO, an MD, a ZIP, a DVD, and so on) 20 is connected to the bus 2 through a floppy-disk controller 19.

A floppy disk (or a storage medium such as a CD-ROM) is inserted into the floppy disk drive (or a drive for a storage medium such as a CD-ROM) 20. In cooperation with an operating system, an instruction is given to the CPU so that the code of a computer program for executing the present invention can be recorded on the floppy disk (or the hard-disk drive 13) and a ROM 14. The code is loaded into the memory 4 and executed. The code of the computer program can be compressed, or it can be divided into a plurality of blocks and recorded on a plurality of storage media.

The system 100 can be further made as a system equipped with user interface hardware. The user interface hardware includes, for example, a pointing device (such as a mouse and/or a joy stick) 7 or a keyboard 6 for inputting data and a display 12 for displaying visual data to users. Also, it is possible to connect a printer through a parallel port 16 and to connect a modem through a serial port 15, and it is possible to communicate with another computer through the same port 15 and a modem or through a communication adapter 18.

Therefore, it will easily follow that the present invention can be implemented by an ordinarily used personal computer (PC), a work station, or a combination of them. However, the aforementioned constituent components are illustrative and not restrictive and all the constituent components do not always become the essential constituent components of the present invention. For example, FIG. 1 shows a stand-alone system, but the present invention may be realized as a client server system. The system 100 of the present invention may be disposed in a server machine and a client machine may be connected to the server machine through a local network by an Ethernet token ring. Also, an input unit for various kinds of inputs and a display for displaying a result of execute of a program may be disposed on the client machine side. In addition, a program-component library 130 to be described later or some program components of the library may be disposed on the server side. The remaining program components may be disposed on the client side and only a builder 100 may be disposed on the client side. The others may be disposed on the server side. Thus, the layout can be freely changed when it is designed.

It is preferable that the operating system be an operating system which supports a GUI multi-window environment at standard, such as Windows (trademark of Microsoft), OS/2 (trademark of IBM), and an X-window system (trademark of MIT) on AIX (trademark of IBM). However, the present invention can be realized even under a character-based environment such as PC-DOS (trademark of IBM) and MS-DOS (trademark of Microsoft) and is not to be limited to a componenticular operating system because only a non-graphical object to be described later can be defined as a program component.

B. System Structure

The system structure of the present invention will next be described in reference to a block diagram of FIG. 2. Program components 131 and 133 are stored in the program-component library 130. The program component manages the information about the property and method of that component. The managed information will be described later. The program development support system of the present invention (hereinafter referred to as a "builder") includes a component-information storage 110 which stores the information about a program component. The information can be rewritten or corrected by a programmer by using a component-information editor 101. The builder 100 further has a property editor 103, with which the property values of the program components 131 and 133 can be changed. An object visually-expressing section 105 displays a graphical program component.

The programmer can also encode a program by using the code editor 107. The coded program code is stored in code storage 109. An interpreter 120 executes a program, based on the program code stored in the code storage 109 and the information about a program component. In a preferred embodiment of the present invention, the code executor 120 is executed by an interpreter. However, the code executor 120 is not a concept that is limited to the interpreter, but it can be executed by a compiler, etc. In the block diagram of FIG. 2, a structure having a fixed function is expressed as a block in order to facilitate an understanding of the present invention. For example, the component-information editor 101 and the property editor 103 can be united and executed as a united component-information editor. Also, the component-information editor 101 can be split into a component-property information editor and a component-method information editor and executed.

Figure 3:
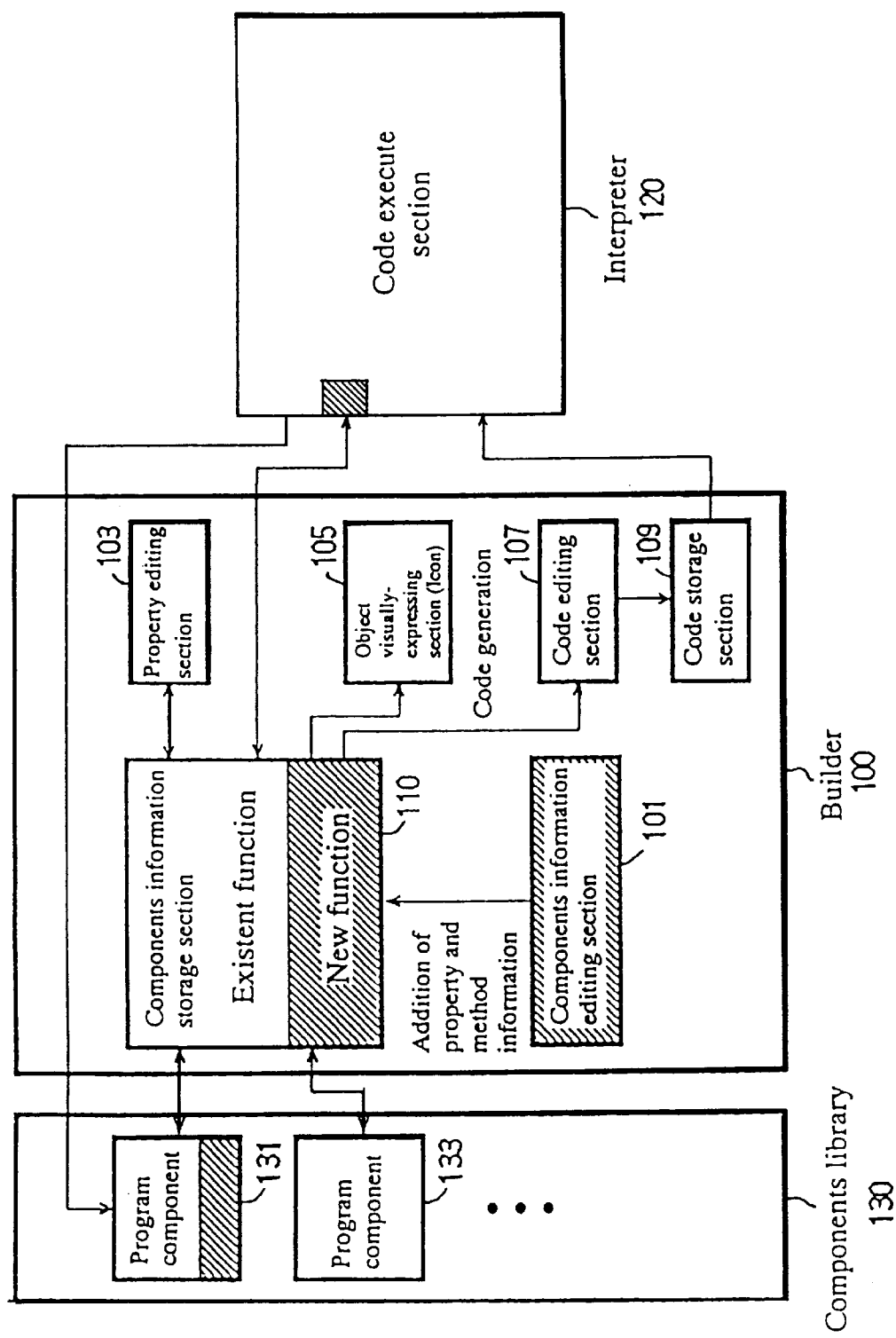
FIG. 3 is a functional block diagram showing the portions differing from prior art, in the embodiment of the system structure of the present invention.

In order to clarify the difference between the present invention and prior art, in FIG. 3 there is shown the different component (indicated by oblique lines) between the embodiment of the system structure of the present invention and prior art. In this figure, the program component 131 is a program component of the present invention and the program component 133 is a conventional program component. It is shown that the builder of the present invention can be handled without making a distinction between the conventional program component and the program component of the present invention. It is also shown that a component-information editing 101 is newly added and that a change has been made in both the component-information storage 110 and the interpreter 120.

B1. Property Table of Component-Information Storage

FIG. 4 is a diagram showing a property table of the component-information storage in a preferred embodiment of the present invention. The property table of the component-information storage (hereinafter referred to as simply a "property table" in order to distinguish it from a component-property table) exists in correspondence with the component name of the program component. The property table 150, as shown in FIG. 4, manages property name 155, property type 156, "GET" function 157, "PUT" function 158, and user-defined flag 159.

The GET function 157 is a function to have access to the program components 131 and 133 and to get the property values from the program components 131 and 133, and the PUT function 158 is a function to put property values to the program components 131 and 133. Depending on the properties of the program components 131 and 133, there are cases where only the GET function 157 is necessary and the PUT function 158 is unnecessary (data is only read from the program component), or cases where only the PUT function 158 is necessary and the GET function 157 is unnecessary (data is only written to the program component). In the specification of the present invention "a property access function" is used as a general term for the GET function 157 and the PUT function 158.

The property table 150 is segmented into an existent property information portion 151 and a user-defined property information portion 153. If the program component 133 is installed in the system, the information about the property name, property type, GET function, and PUT function of the program component 133 will be copied and registered in the existent property information portion 151 of the property table 150.

on the other hand, in the user-defined property information portion 153, if a program component is specified and newly registered by a programmer with the component-information editor 101, the registered property name and property type will be set and the property access function (GET function and PUT function) will be automatically generated. In the specification of the present invention, the property or method which a user defines by specifying a property name or a method name is called the "user-defined property" or "user-defined method," and the conventional property or method is called the "existent property" or "existent method."

The property access function, in a preferred embodiment of the present invention, is set as a property access function called "GetProperty/PutProperty," which is common to user-defined properties. (The property access function which is common to a plurality of pieces of user-defined property information will hereinafter be referred to as a "generic property access function.")

As shown in FIG. 4, since the existent property information portion 151 and the user-defined property information portion 153 are managed in common format, the property editor 103, the program builder 100, and the interpreter 120, as with the existent property information portion 151, can handle the user-defined property information portion 153. However, the existent property information and the user-defined property information are not always managed in common format, but the present invention can also be executed by making a change in the property editor 103 which has access to the property table 150 of the component-information storage 110 so that two kinds of tables can be accessed. Furthermore, the existent property information and the user-defined property information are not always managed by a table. If a property name is stored in a key in the form where the information corresponding to the property name can be accessed, the present invention can be executed.

In a preferred embodiment of the present invention, in the property made by user's registration there is set the flag 159 indicating that the property is a property defined by a user. Note that such a flag is not the essential constituent component of the present invention but is sufficient if a system can judge whether information is existent property information or user-defined property information. The judgment can be performed by the information about the positions at which the existent property information and the user-defined property information are stored, or it can be done by the name which can make a distinction between the property name of the user-defined property information and the property name of the existent property information (for example, the head or last of the property name is given "USR").

B2. Method Table of Component-Information Storage

FIG. 5 is a diagram showing a method table of the component-information storage in a preferred embodiment of the present invention. The method table of the component-information storage (hereinafter referred to as simply a "method table"), as with the property table 150, exists in correspondence with the component name of the program component and is constituted by an existent method information portion 161 and a user-registered method information 163. The existent method information portion 161 of the method table 160, as shown in the figure, manages method name 165, mounting-function address information (in a preferred embodiment of the present invention a C language is used) 167, method type 168, and user-defined flag 169.

The mounting-function address information 167 manages address information for pointing to a module which is started up when a method is executed in the program component managed by the method table. For example, in the case where the program component is a button icon component and the method is "move", address information for pointing to a program module which is executed for moving the button icon is managed. Because the mounting function of the existent method information is managed by the program component, the mounting-function address information is an address for pointing to the mounting functions of the program components 131 and 133. The method type 168 defines property needed for executing the method. Specifically, the property is defined in the form of "argument 1, argument 2, . . . , and argument n/ return value 1, return value 2, . . . , and return value m." The method has only an argument, only a return value, both an argument and a return value, or neither an argument nor a return value, depending upon the kind.

Likewise, the user-defined method information portion 163 manages the method name 165, the mounting-function address information 167, the method type 168, and user-defined flag 169. Thus, since the existent method information portion 161 and the user-defined method information portion 163 are managed in common format, the property editor 103, the program builder 100, and the interpreter 120, as with the existent method information portion 161, can handle the user-defined method information portion 163. In the user-defined method information portion 163, the mounting-function address information 167 is defined with respect to a single program component and common to a plurality of pieces of user-defined method information. The mounting-function address information 167 manages address information for pointing to the method call adapter 137 of the program component 131 which will be described later.

As with the property information in the program component, if the program component 133 is installed in the system, the information about the method name, mounting function, and method type of the program component 133 will be copied and registered in the existent method information portion 161 of the method table 160. On the other hand, in the user-defined method information portion 163, if a program component is specified and newly registered by a programmer with the component-information editor 101, the registered method name and method type will be set and the mounting function will be automatically generated.

In a preferred embodiment of the present invention, in the mounting function there is set information for pointing to a false mounting function called "CallMethod," which exists in a program component common to user-defined methods. (The mounting-function address information which is common to a plurality of pieces of user-defined method information will hereinafter be referred to as a "generic method function.") Also, in a preferred embodiment of the present invention, as with the property defined by a user, in the method made by user's registration there is set the flag 169 indicating that the method is a method defined by a user. Note that such a flag, as with the flag 159 in the property information, is not the essential constituent component of the present invention but is sufficient if a system can judge whether information is existent method information or user-defined method information. Also, as described in the property information, it is not indispensable to manage the existent method information and the user-defined method information in common format. Furthermore, it is not indispensable to manage them in the form of a table.

B3. Program-Component Property Information

A description will next be made of information that is managed by the program component 131. The program component 131, as with the information managed by the component-information storage 110, manages information about the property of a program component and information about the method of a program component. However, as described in the component-information storage 110, there are cases where the program component manages only the property information or only the method information, so it is not the essential constituent condition of the present invention to have the two kinds of pieces of information at the same time.

FIG. 6 is a diagram showing the property information of a program component (hereinafter referred to as "component-property information") and the property table of a program component (hereinafter referred to as a "component-property table for distinguishing it from the property table of the component-information storage 110) in a preferred embodiment of the present invention. The information, managed by the component-property property name 175, property type 176, "GET" function 177, "PUT" function 178, and user-defined flag 179 information 171, is information that corresponds to the existent property information 151 described in the component-information storage 110. The information managed by the component-property table 173 is information that corresponds to the user-defined property information 153. The component-property information 171, as the name implies, is not managed in the form of a table even in a preferred embodiment of the present invention. When a program component is introduced into a system, the content of the component-property information 171 is declared to the side of the builder 100 and therefore the builder 100 can recognize the content or kind of the information.

The component-property information 171 manages nearly the same information as the information of the property table 151 in the existent property of the component-information storage 110. The differing point between pieces of information managed by the property table 151 and the component-property information 171 is that the component-property information 171 manages the information of an actual property value with respect to property. There is the case where the property value 179 is set by a default value when the program component 131 is installed, or the case where the property value 179 is set by the property editor 103.

The component-property table 173, on the other hand, manages property name 175, type 176, and property value 179. The information of the property table 173 is set by the programmer's registration in the component-information editor 101. Note that the information of the property value 179 can also be input from the property editor 103.

B4. Program-Component Method Information

A description will next be made of how the method information is managed in the program component 131. FIG. 7 is a diagram showing the method information of a program component (hereinafter referred to as simply "component-method information") in a preferred embodiment of the present invention. The component-method information 180, as the method table 160 in the component-information storage 110, manages the method name 185 and method type 188 of existent method information. The mounting function 187, unlike the method table 160 of the component-information storage 110, manages a module which is started up when the method is executed.

For the user-defined method information, on the program component 131 it is not managed on the program component side, as in the existent method information, and instead, a method call adapter 137 is present. Although the method call adapter will be described in detail later, it manages a function for pointing to a module which is started up when the method of the user-defined method information is executed.

C. System Operation

In a preferred embodiment of the present invention, in order to extend the function of the program component, the component-information storage 110, the program component 131, and the interpreter 120 are respectively extended and the component-information editor 101 is newly added, as shown in FIG. 3. The expansion of each section and the operation of the system will hereinafter be described from the viewpoint of the user definition of component information, the use of component information by the builder, and the use of component information at execute.

C1. User Definition of Component Information

Figure 8:
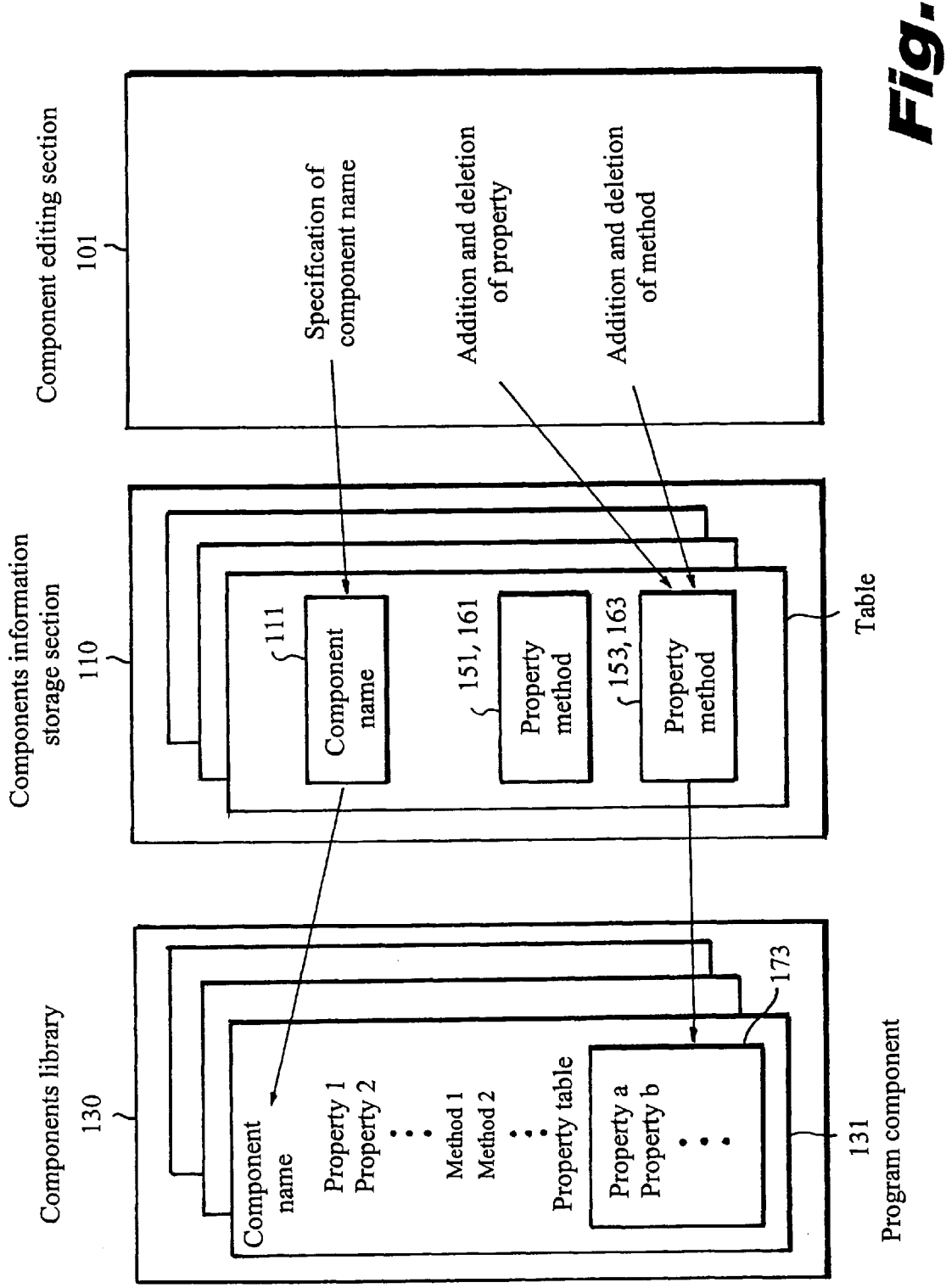
FIG. 8 is a diagram showing the flow of data as component information is updated in a preferred embodiment of the present invention.

FIG. 8 is a diagram showing the flow of data as component information is defined by a programmer (user), in a preferred embodiment of the present invention. Updating of component information, that is, property addition, property change, and property deletion, and method addition, method change, and method deletion can be performed by the function of the component-information editor 101.

(1) Property Definition

A programmer specifies a program component in the component-information editor 101 and then an entry for inputting property information can be displayed. In a preferred embodiment of the present invention the program component is provided as a new program-component registration icon or an existent program-component icon, so the program component can be selected by clicking on the icon of the program component.

When the program component specified by a programmer has already existed (in a preferred embodiment of the present invention a program component already registered can be selected at a pull-down menu), the property information of the program component is displayed so that it can be corrected and deleted by the user. The programmer can correct the property type 156. Also, if the property name 155 is corrected, it will be registered as a new property after correction. When the program component selected by the programmer is a new one, the programmer inputs the property name 155 and the property type 156. In a preferred embodiment of the present invention, when updating (addition/correction/deletion) is performed, the updating where contradiction occurs internally can be checked by syntax checking and thus the updating where contradiction occurs can be automatically corrected or rejected.

In the case where the existent property information is updated by the user's registration operation, the property information of the property table 153 in the component-information storage 110 is updated internally (in the case of the updating of the existent property information, the property type 156 is updated, and in the case of the deletion of the existent property, the property name 155, property type 156, property access functions 157 and 158, and flag 159 of the property are deleted), and furthermore, the information of the component-property information 171 of the corresponding program component 131 is also changed correspondingly.

In the case where the program component specified by the programmer is a new one which does not exist in the system, the name of the program component specified by the user is registered in the component-information storage 110 and the corresponding program component. Also, the property name 155 and the property type 156, defined by the user, are registered in the property table 153 of the registered program component. Furthermore, the generic property access function is automatically set to the property access functions 157 and 158, and "1", for indicating that property is user-defined property, is automatically set to the flag 159. Finally, the property name and the property type, defined by the user, are set to the property name 175 and the property type 176 of the component-property table 173 in the corresponding program component 131.

(2) Method Definition

As with the definition of the property, if a programmer specifies a program component in the component-information editor 101, an entry for inputting method information will be displayed. When the program component specified by a programmer has already existed, the method information of the program component is displayed so that it can be corrected and deleted by the user. The programmer can correct the method type 168. Also, if the method name 165 is corrected, it will be registered as a new method after correction. When the program component selected by the programmer is a new one, the programmer inputs the method name 165 and the method type 168. In a preferred embodiment of the present invention, when updating (addition/correction/deletion) is performed, the updating where contradiction occurs internally can be checked by syntax checking and thus the updating where contradiction occurs can be automatically corrected or rejected.

In the case where the existent method information is updated by the user's registration operation, the method information of the method table 163 in the component-information storage 110 is updated internally (in the case of the updating of the existent method information, the method type 168 is updated, and in the case of the deletion of the existent method information, the method name 165, mounting-function address information 167, method type 168, and flag 169 of the method are deleted), and furthermore, the information of the component-method information 180 of the corresponding program component 131 is also changed correspondingly.

In the case where the program component specified by the programmer is a new one which does not exist in the system, the name of the program component specified by the user is registered in the component-information storage 110 and the corresponding program component. Also, in the method table 163 of the registered program component, the method name 165 and the method type 168, defined by the user, are set to the content defined in the component-information editor 101. Furthermore, the generic method function is automatically set to the mounting-function address information 167, and "1" for indicating that a method is a user-defined method is automatically set to the flag 169. In this respect, the movement of the component-information editor 101 and the component-information storage 110 is the same as the case of the property information. However, in the case of the method information, in a preferred embodiment of the present invention the method information of the method table 163 in the component-information storage 110 is updated only and there is no updating of the program component 131. This is because the code of a method, stored in another place, can be utilized by the operation of a method call adapter which will be described later. However, if a sufficient storage area can be assured in the program component, it will also be possible to manage the code of a method at the program component side, as in the case of the property.

C2. Program Generation Support by User-defined Component Information

Figure 9:
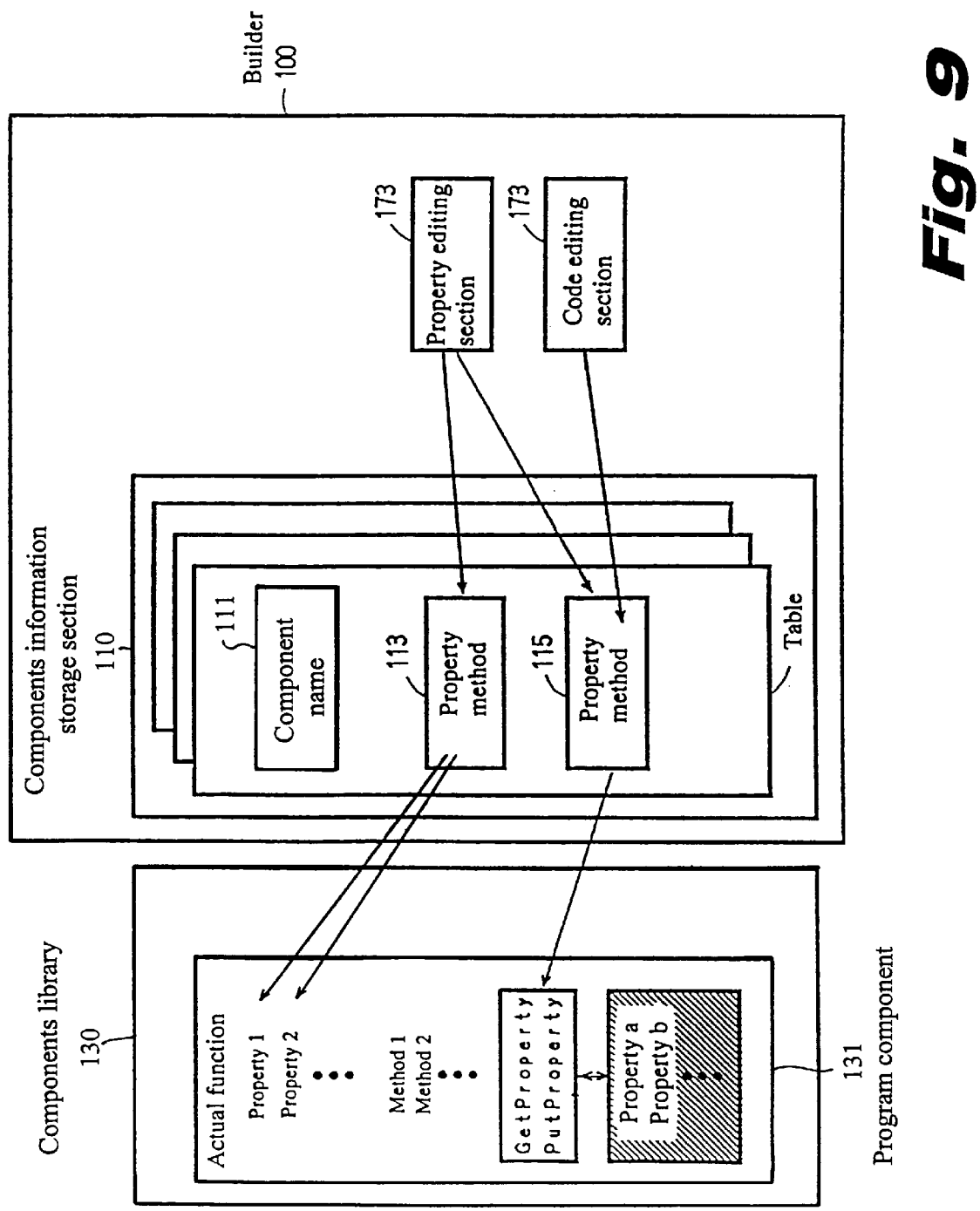
FIG. 9 is a diagram showing the flow of data as a builder utilizes component information in a preferred embodiment of the present invention.

A description will next be made of how the program component defined in the aforementioned way by the user is utilized when a program is generated. FIG. 9 is a diagram showing the flow of data as the builder utilizes program component information, in a preferred embodiment of the present invention.

(1) Property Value Setting

A programmer can set the property value of the program component specified with the property editor 103. In a preferred embodiment of the present invention the property table 150 of the component-information storage 110 manages an existent property and a user-defined property with a common table, so the property editor 103 can access the property information of the user-defined property table 153 of the component-information storage 110, even if a change is not made in the function of a conventional property editor. It is not indispensable that the property table 150 of the component-information storage 110 manages the existent property table 151 and the user-defined property table 153 in common format, and the property table 150 of the component-information storage 110 can execute the property editor 103 by extending the function of the property editor so that the property table 150 can be accessed to two different tables, the existent property table 151 and the user-defined property table 153.

When a property value defined by a programmer is existent property information, the builder 100 has access to the property value 179 of the component-property information 171 of the program component 131 by using the property access functions 157 and 158 of the property table 151 and employing a conventional method and then can set the property value of the specified program component by using the property editor 103.

When a property value specified by a programmer is the property value of user-defined property, the builder 100 has access to the property value 179 of the component-property table 173 of the program component 131 by employing the property name 155 and the generic property access functions 157 and 158 of the property table 153 of the component-information storage 110 and then can set the property value by employing the property editor 103.

Specifically, the builder 100 first displays the property name 155 stored in the property table 150 of the component-information storage 110, in order to make it possible to register a user-defined property value with the property editor 103. Also, in order to display a property value corresponding to the property name 155, it is first judged whether the property is an existent property or a user-defined property, by checking the flag 159 of the property table 150.

When it is judged that the property is a user-defined property, the component-property table 173 of the program component 131 is accessed by employing the "GetProperty" 157 of one of the generic property access functions. Then, it becomes possible that the property value 179 of the component-property table 173 is displayed on the property editor 103, by retrieving the property name 175 by a key and sending the value to the property editor 103. (When there is no registered value, a blank is displayed.)

Then, if a programmer changes the property value of the property editor 103, the builder 100 has access to the property value 179 of the component-property table 173 of the program component 131 by employing the property name 155 and the "PutProperty" 158 of one of the generic property access functions, stored in the property table 153 of the component-information storage 110, and updates the property value.

(2) Utilization of Method Information

A programmer can makes a description in the code editor 107 so that the method of a user-defined program component is specified. With this, the method can be executed in the code executor 120, and a detailed description will be made later.

C3. Execute of a Program Made by Using User-defined Component Information

A description will next be made of how a program, made by using a program component defined by a user, is executed.

Figure 10:
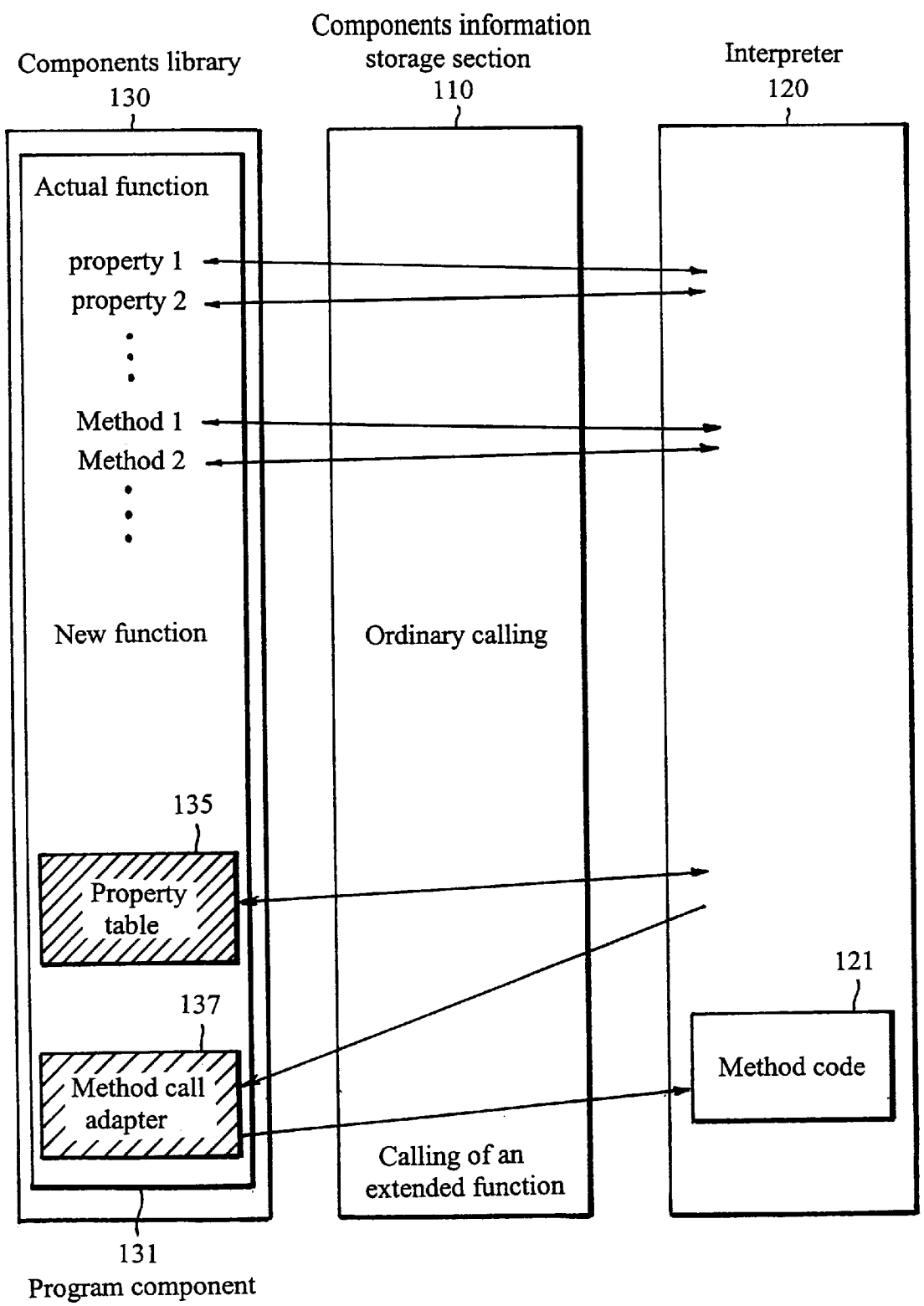
FIG. 10 is a diagram showing the flow of data as component information is utilized at the time of program execute in a preferred embodiment of the present invention.

FIG. 10 is a diagram showing the flow of data as program component information is utilized at the time of program execute, in a preferred embodiment of the present invention. First, the code described in the code storage 109 is interpreted by the interpreter 120 for the call of existent property information (which is not user-defined information but conventional program component information) and method information. Here, if the program component name and the property name are specified, or if the program component name and the method name are specified, the interpreter 120 can utilize the program component information.

(1) Utilization of Property Information

Figure 11:
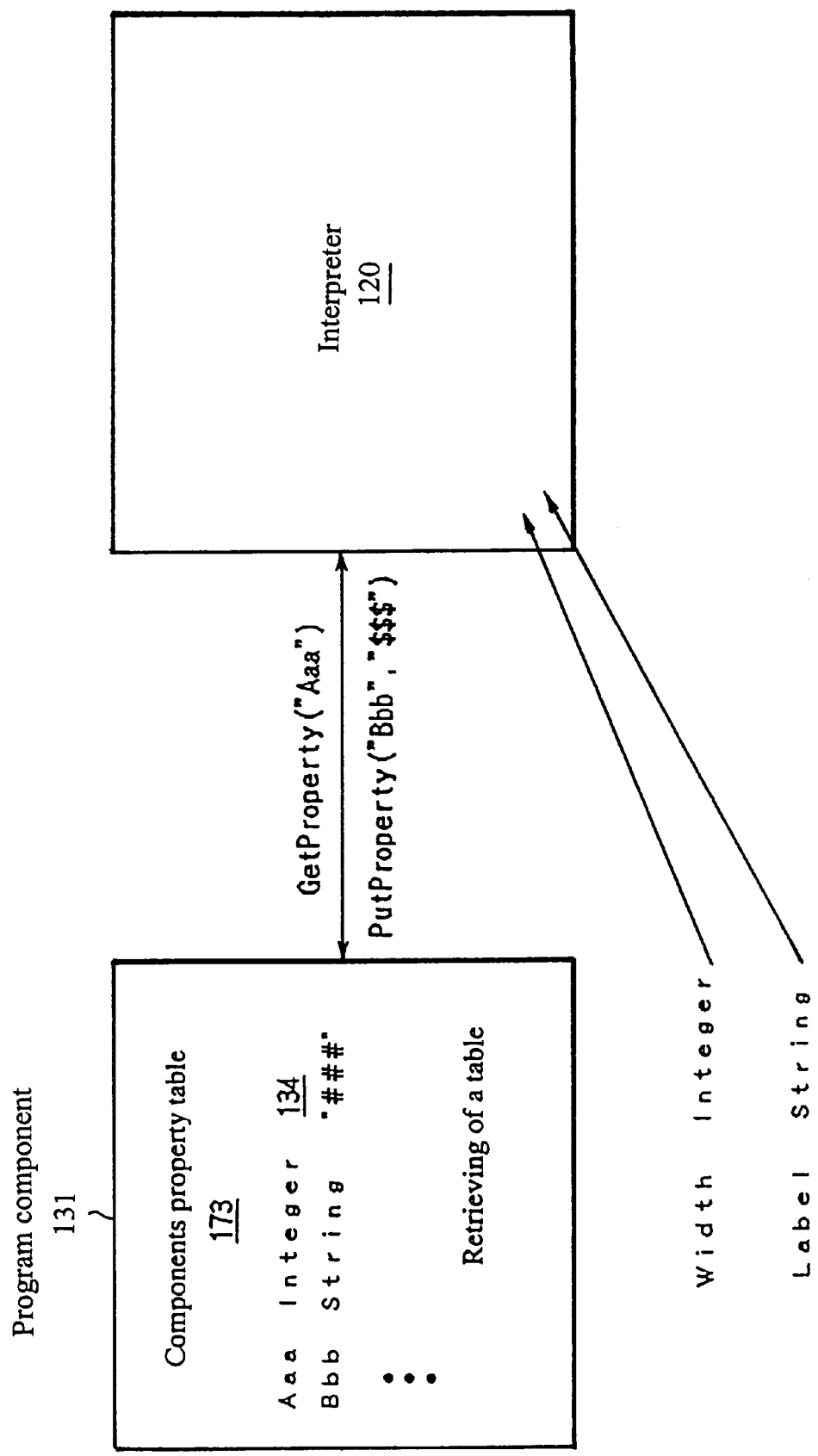
FIG. 11 is a diagram showing the flow of data as component information is utilized at the time of program execute in a preferred embodiment of the present invention.

FIG. 11 is a diagram showing the flow of data as user-defined property information is utilized at the time of program execute, in a preferred embodiment of the present invention. When the interpreter 120 utilizes the property information of a program component, the interpreter requests information for having access to the property value 179 of the program component 131 from the builder 100. The builder 100 retrieves the property name of the property table 150 of the component-information storage 110 sent by the interpreter 120 from a key. The builder 100 judges whether the property requested by the interpreter 120 is user-defined property information or existent property information by checking the flag 159 of the property table 150 of the component-information storage 110.

When the property is existent property information, the builder 100 sends back the property access functions 157 and 158 of the property table 150 to the interpreter 120. At this time, the interpreter 120 can judge from the content of the code whether the access to the property value of the program component is "get" or "put." Therefore, there is a method where the interpreter 120 specifies and receives either the GET property access function 157 or the PUT property access function 158 from the builder 100, or a method where the interpreter 120 receives both the GET property access function 157 or the PUT property access function 158 and selects either one.

With the obtained information, the interpreter 120 has access to the component-property information of the program components 131 and 133 and also has access to the property value 179. In the case of the GET property access function 157, a read operation is performed with respect to the property value 179. In the case of the PUT property access function 158, a write operation is performed with respect to the property value 179.

On the other hand, in the case of user-defined property, the builder 100 sends back the generic property access functions 157 and 158, where a property name is an argument, to the interpreter 120. At this time, as with the access to the existent property information, the interpreter 120 can judge from the content of the code whether the access to the property value of the program component is "get" or "put." Therefore, there is a method where the interpreter 120 specifies and receives either the generic GET property access function 157 or the generic PUT property access function 158 from the builder 100, or a method where the interpreter 120 receives both the generic GET property access function 157 or the generic PUT property access function 158 and selects either one.

Also, the interpreter 120 may obtain a property name from a key for information of whether property is user-defined property or existent property, with respect to the builder 100. The builder 100 may return only the flag 159 of the property table 150 to the interpreter 120 and issue a generic property access function at the side of the interpreter 120. Furthermore, by sending a program component name and a property name to the interpreter 120 when property information is registered in the program component 131, it becomes unnecessary that the interpreter 120 makes an inquiry of information of whether user-defined property or existent property to the side of the builder 100.

With the aforementioned information, the interpreter 120 has access to the component-property table of the program component 131 and also has access to the property value 179. In the case of the generic GET property access function 157, a read operation is performed with respect to the property value 179. In the case of the generic PUT property access function 158, a write operation is performed with respect to the property value 179.

(2) Access to Method Information

Figure 12:
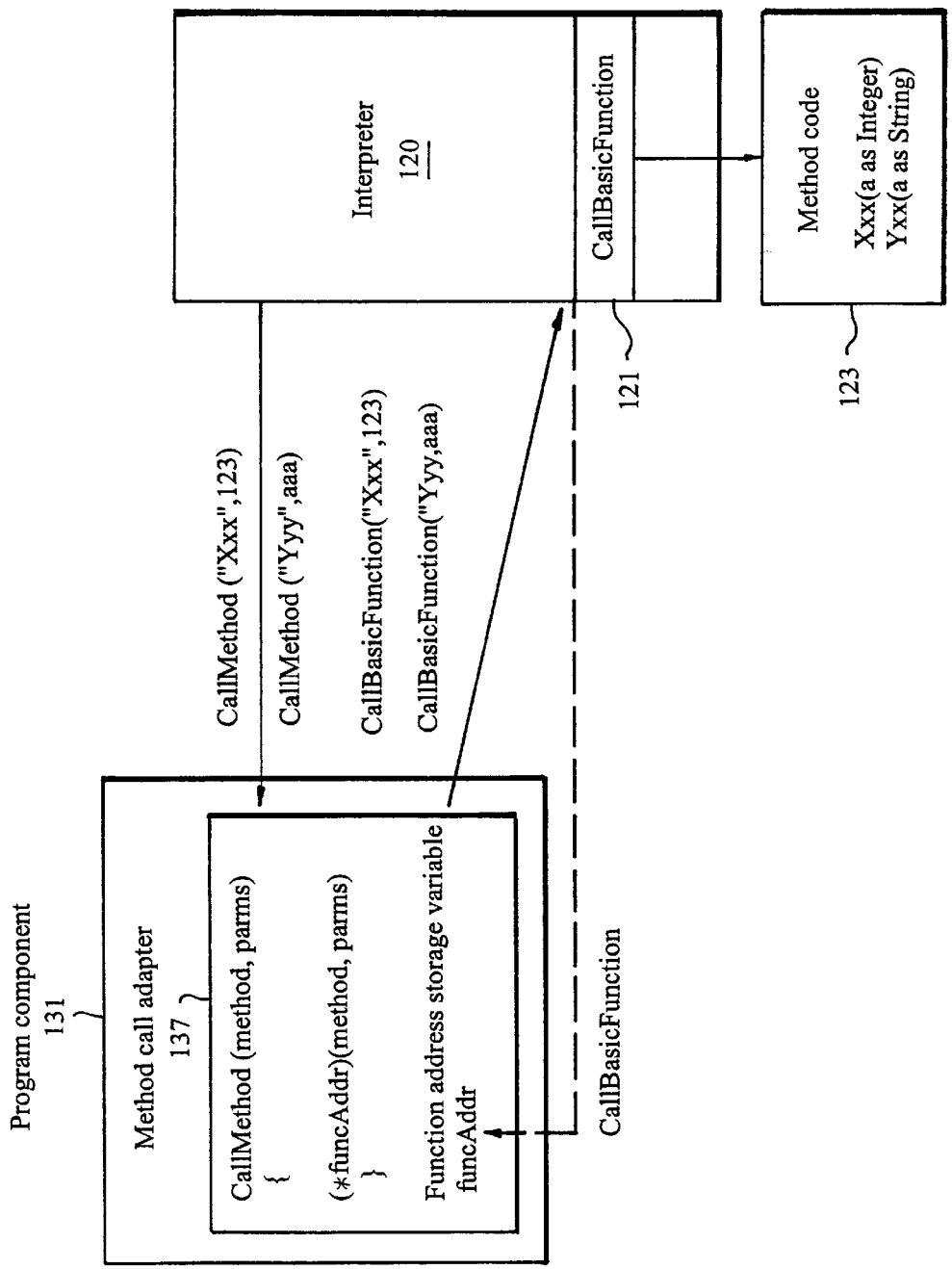
FIG. 12 is a diagram showing the flow of data as component information is utilized at the time of program execute in a preferred embodiment of the present invention.
Figure 13:
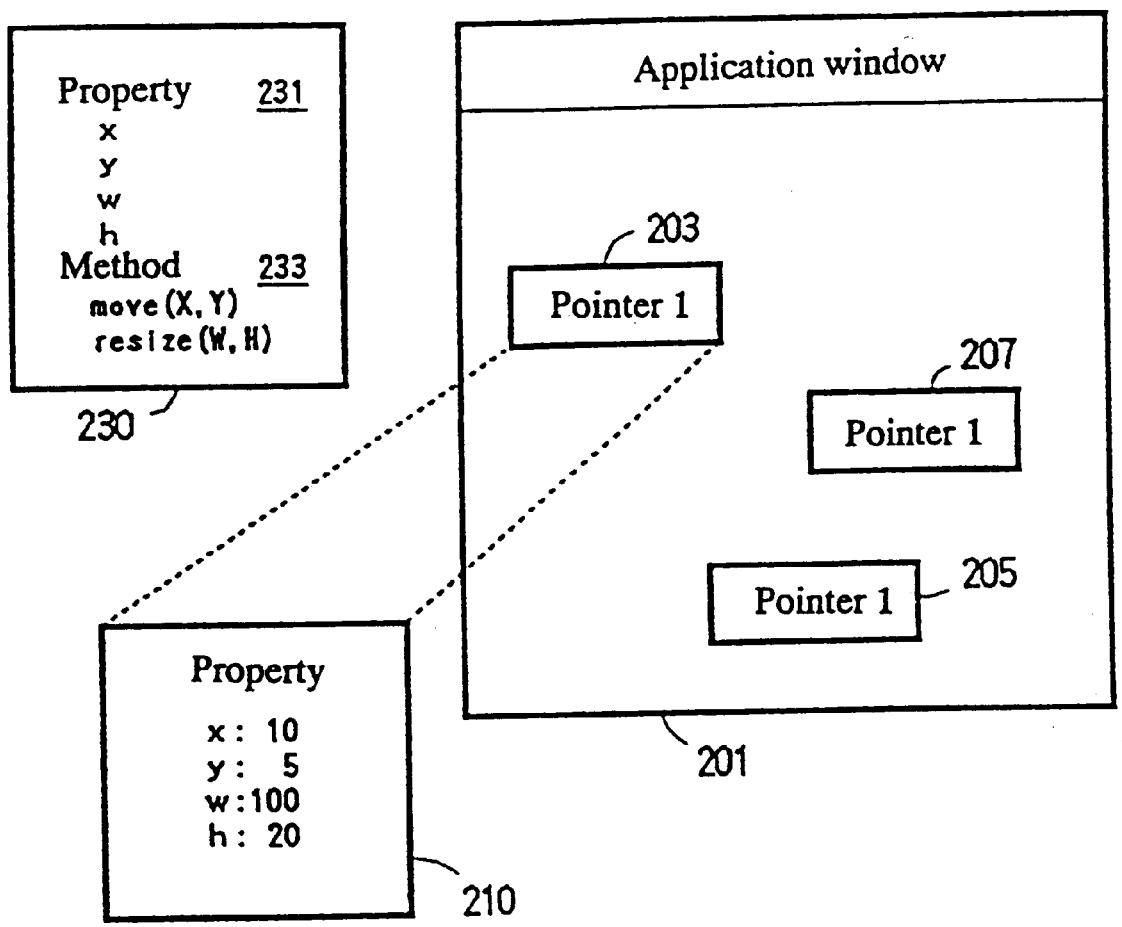
FIG. 13 is a diagram showing an example of the utilization of a conventional program component.
Figure 14:
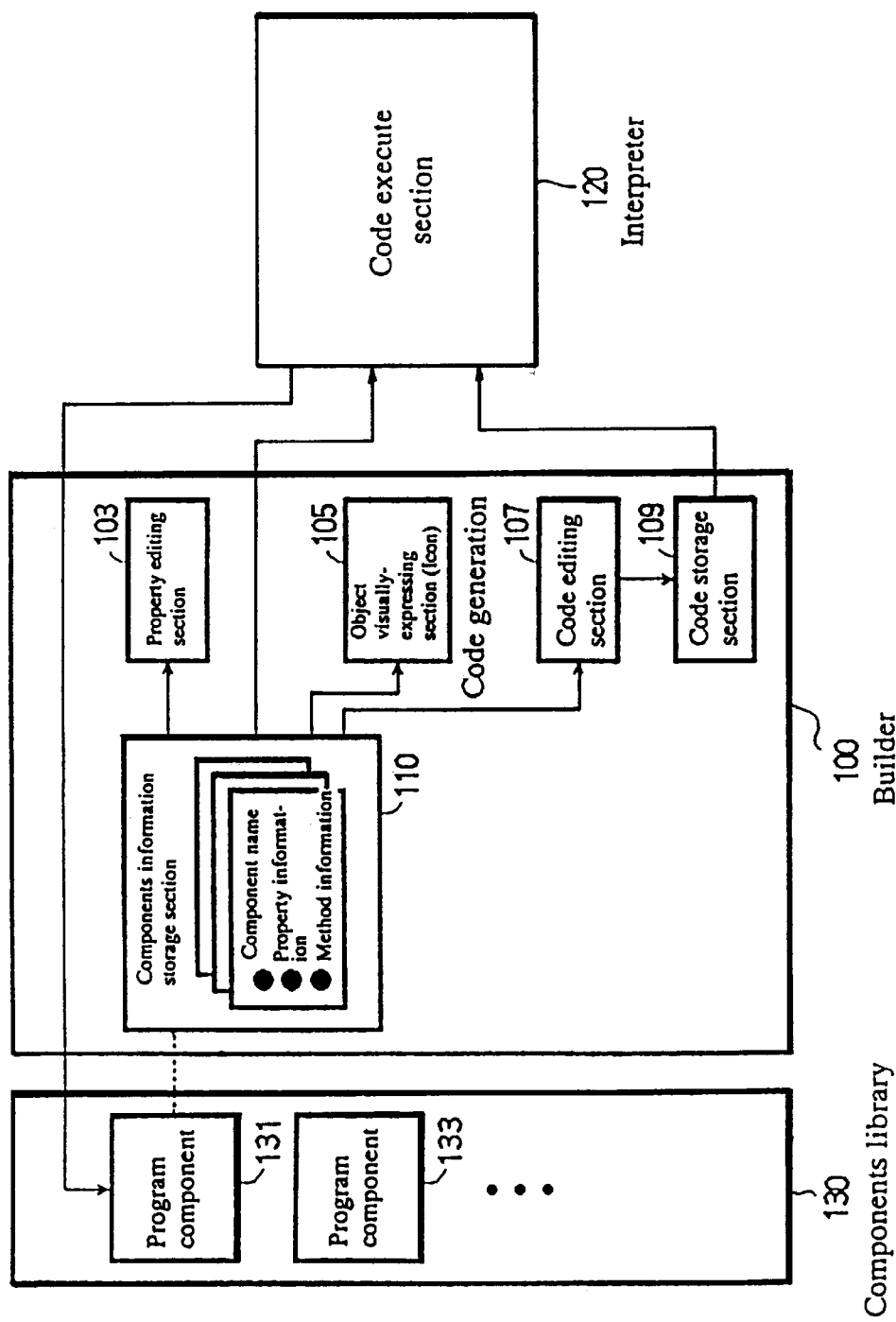
FIG. 14 is a diagram showing a conventional program generation support system.

FIG. 12 is a diagram showing the flow of data as user-defined method information is utilized at the time of program execute, in a preferred embodiment of the present invention. The call of an existent method is done by directly calling out a function which corresponds to the method. However, a function corresponding to a newly added method is not present on the program component side but is managed by the interpreter 120. Hence, a dummy function is prepared and the interpreter calls out this function, together with the function name. The interpreter issues a generic method function where a method name is an argument, according to a method which is nearly identical with property information.

The method call adapter 137 of the program component 131 converts the generic method function received from the interpreter 120 to information which points to a position at which the method code 123 managed by the interpreter 120 is stored. (This information will hereinafter be referred to as "generic method code access information.") In a preferred embodiment of the present invention, the generic method code access information is returned to the interpreter side with a method name as an argument. In a preferred embodiment of the present invention, the method code 123 is generated by the code editor 107, and the method name is stored in a key and the method code 123 is stored in the code storage 109 so that the interpreter 120 can retrieve the code. If the interpreter 120 receives generic method code access information, the method name will be retrieved from a key and the method code 123 will be retrieved and the method code 123 will be executed.

D. Programmer's Operation Procedure

The form of utilization of a program component in a preferred embodiment of the present invention will next be described along programmer's operation procedure.

D1. Definition Procedure of Component Information

Figure 15:
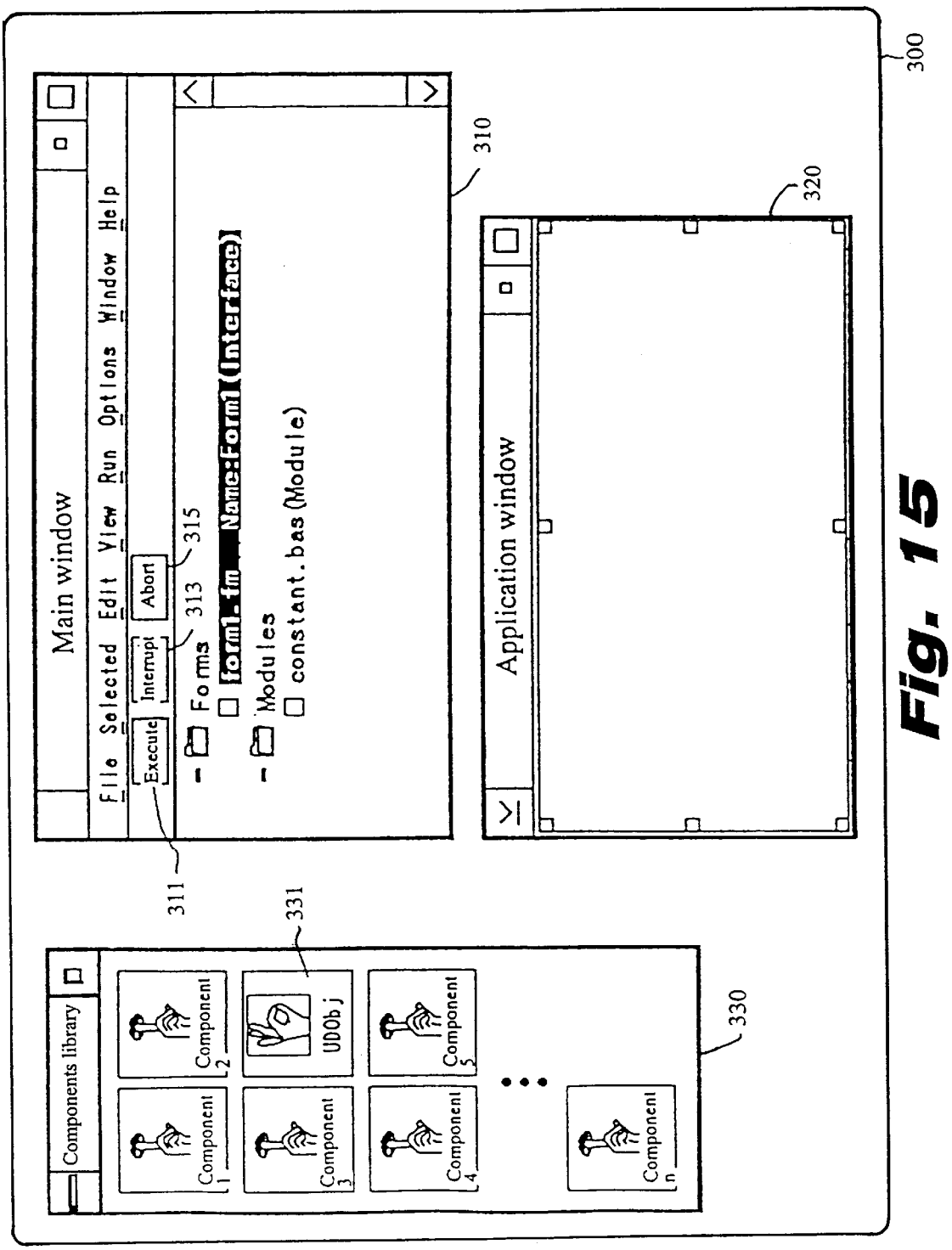
FIG. 15 is a diagram showing a procedure of setting a program component in a preferred embodiment of the present invention.

FIGS. 15 through 19 are diagrams showing a procedure of setting a program component, in a preferred embodiment of the present invention. FIG. 15 is a diagram showing the initial state in the setting procedure of the program component. In the figure a main window 310 is the main window of the builder and is a window for managing various kinds of forms corresponding to an application window 320 and various kinds of codes stored in the code storage 109.

Figure 2:
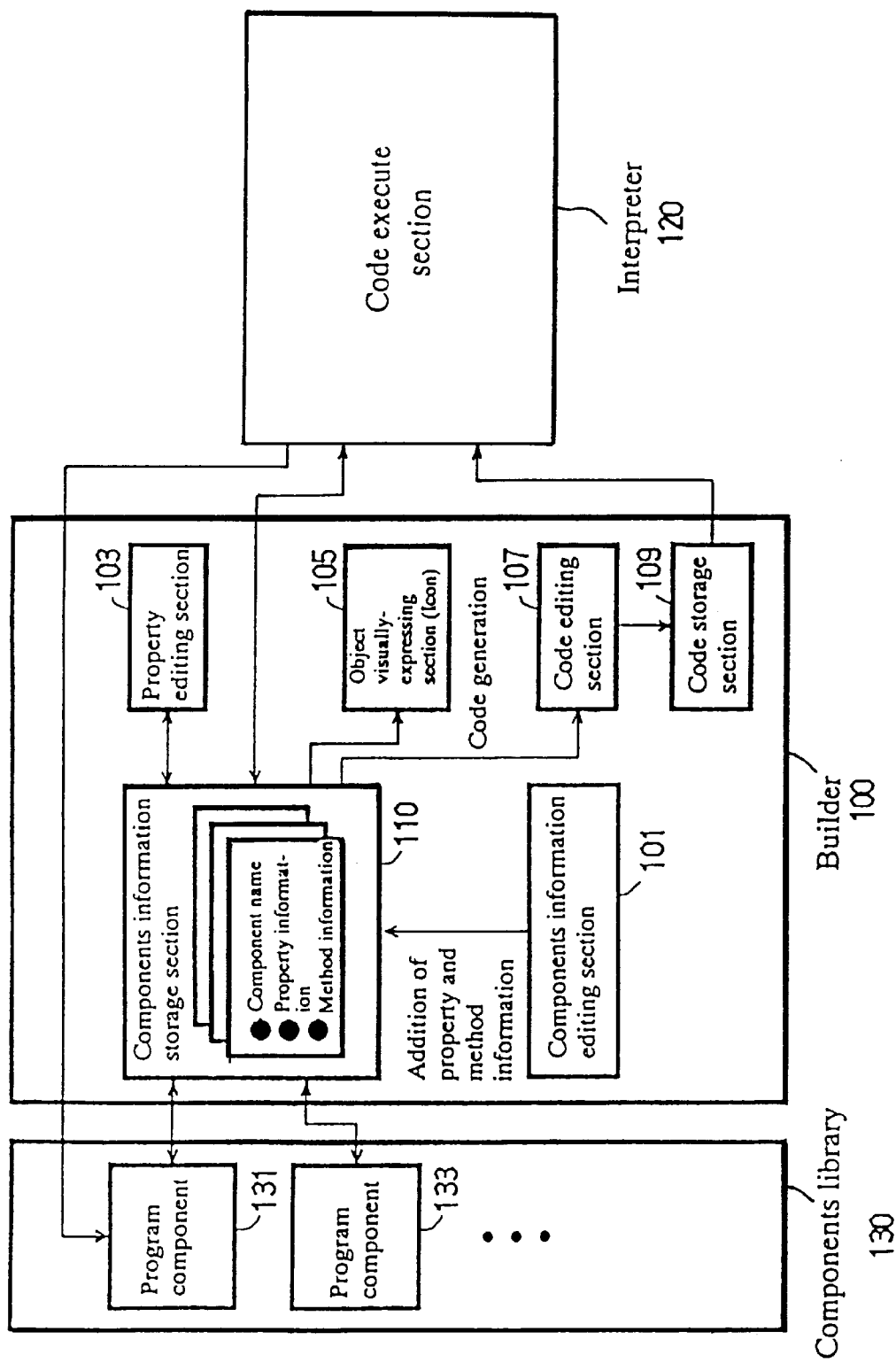
FIG. 2 is a functional block diagram showing an embodiment of the system structure of the present invention.

The application window 320 is a window corresponding to the object visually-expressing section 105 shown in FIGS. 2 and 3. In the initial state there is no information, so a programmer specifies a program component by employing the application window 320. This application window will enable a programmer to make an intuitively understandable program. Note that it is possible to display specification of a program component even by extending the display function of a component-library described later, so the application window does not form the essential constituent component of the present invention.

Figure 16:
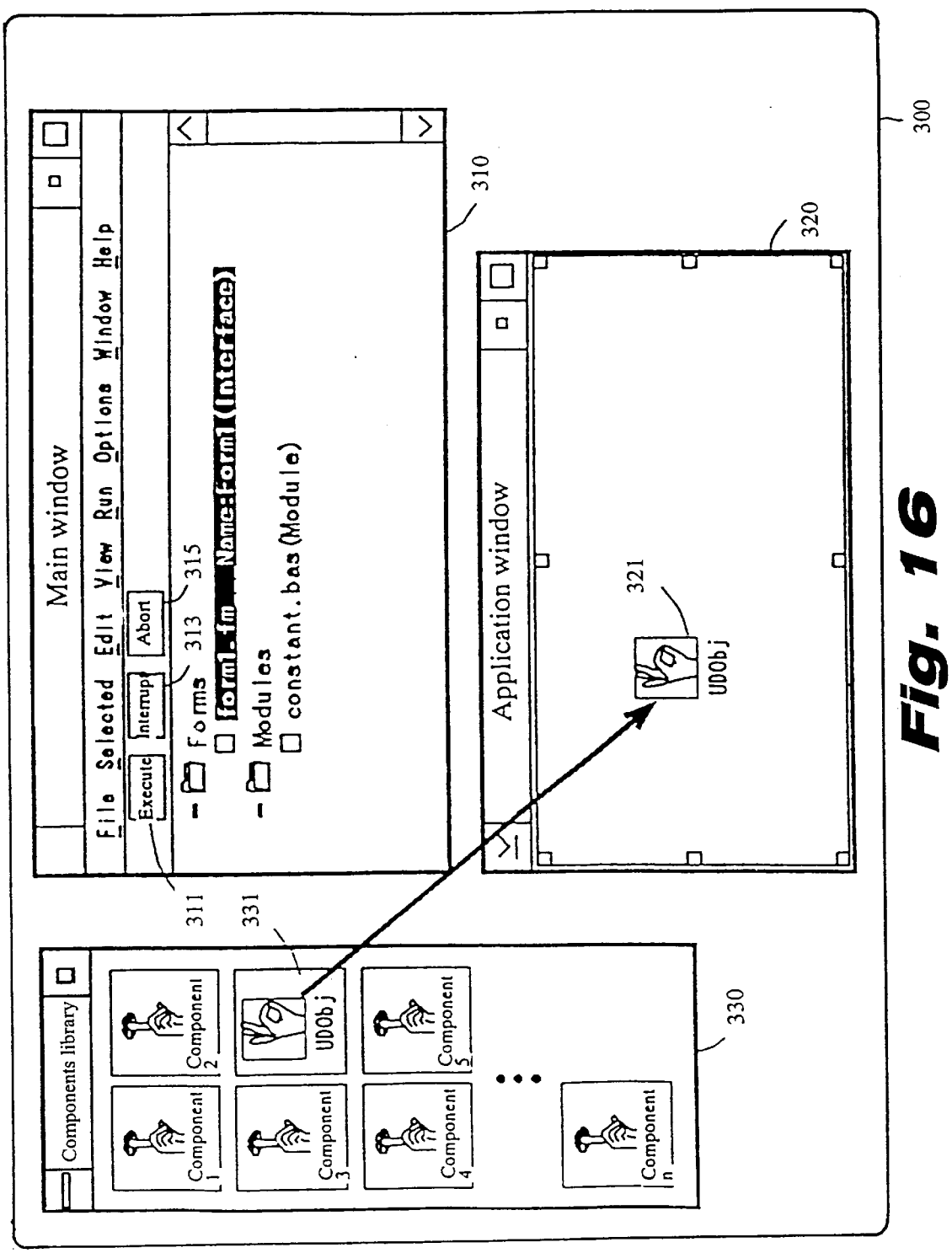
FIG. 16 is a diagram showing a procedure of setting a program component in a preferred embodiment of the present invention.

A set of icons disposed on the left upper side of FIG. 15 is a component-library 330 which holds various components. Each one of the icons corresponds to a program component. Among the icons, icon 331 labeled "UDObj" is an icon that is provided exclusively to a user-defined program component. When a programmer makes a new program component, the UDObj icon 331 is first dropped onto the application window 320, as shown in FIG. 16 (icon 321). In the method of positioning the icon 331 on the application window 320, a double clicking operation can be performed in addition to a dragging and dropping operation. Also, a previously set key can be depressed with the icon 331 selected. The positioning method is a matter which can be set in various ways when designed.

Figure 17:
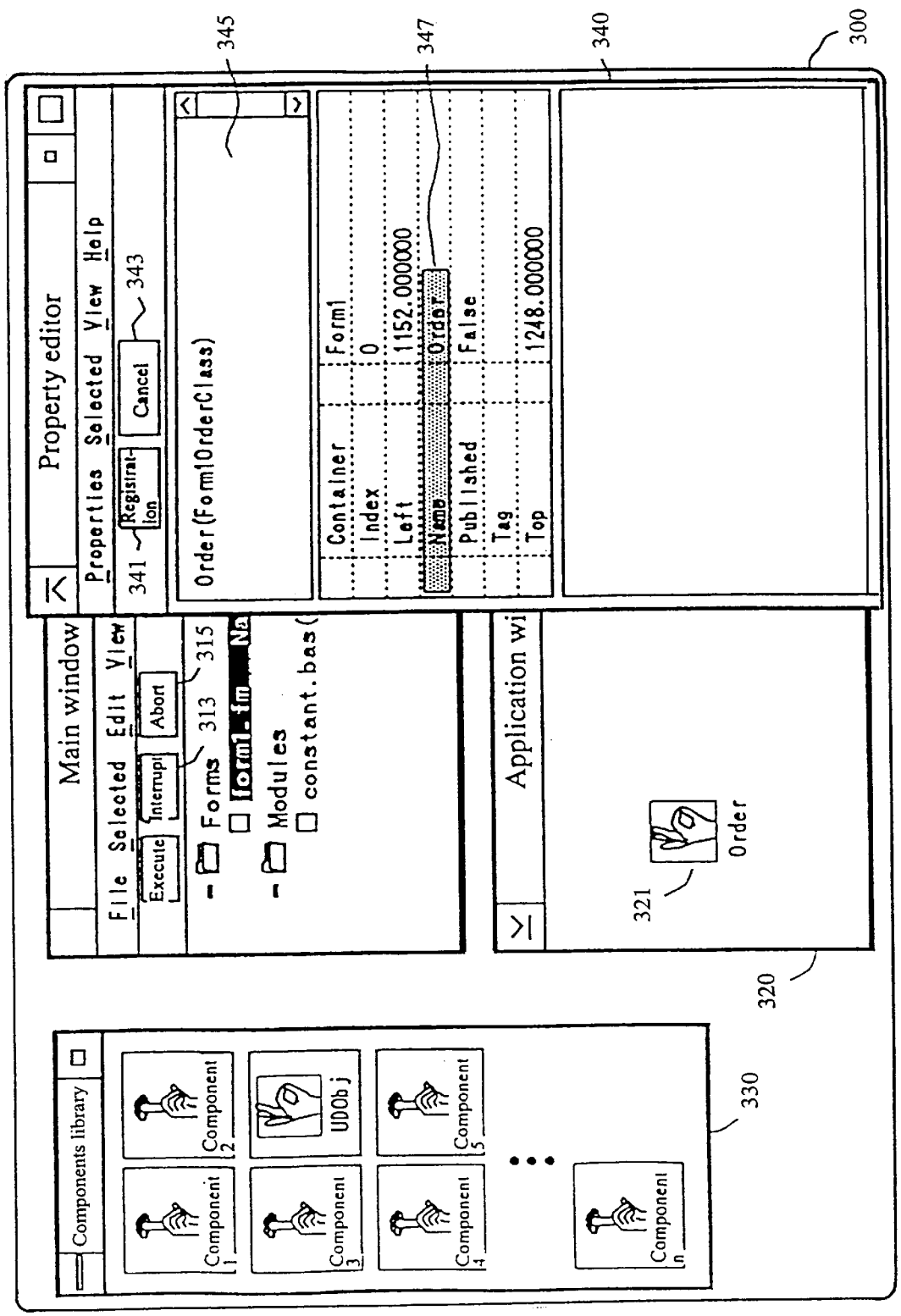
FIG. 17 is a diagram showing a procedure of setting a program component in a preferred embodiment of the present invention.

As shown in FIG. 17, if a programmer selects by a clicking operation an item of the window of the main window 310 to display a pull-down menu and also selects an item of property editor, then a property editor window 340 will be opened. As an example of the method or procedure of opening a window which corresponds to this icon, there are various methods, such as a method where the property editor window 340 is opened when a double clicking operation is performed so that the icon 321 on the application window 320 is selected. Those skilled in the art can select and implement a desired method or procedure from various methods or procedures when it is designed. In a preferred embodiment of the present invention, if the icon 331 for new registration is dropped onto the application window 320, the property editor window 340 will be automatically opened and a cursor will be positioned on a program component name input entry 347 which is highlighted so that the programmer can input a program component name. Notice that the property editor window 340 corresponds to the property editor 103 shown in FIGS. 2 and 3.

The programmer can first set the name of a program component. In the figure, the programmer sets the program component name to "Order" by inputting it to the program component name input entry 347 of the property editor window 340 through a keyboard. Then, the content of the programmer's input is registered by selecting a button icon 341 labeled "registration." With this operation, an empty property table 150 and method table 160 are made in the component-information storage 110 in correspondence with the program component name, "Order." Also, a new program component of the program component name "Order" is made in the component-library 130.

In a preferred embodiment of the present invention, the property table 150 which is registered in the component-information storage 110 is not empty in the initial state of registration. That is, "Container" indicating which application window a program component is positioned on, a property name such as an index, or a property value is automatically set and registered in the property table 150 of the component-information storage 110 or the property information of the program component. It is also possible to display this program component on the component-library 330 as an icon so that the icon can be selected. Note that a button icon 343 for cancellation is provided on the property editor window 340. If this button is selected by clicking on the button, an unregistered character string, input to each entry of the property editor window 340, will become invalid.

Figure 18:
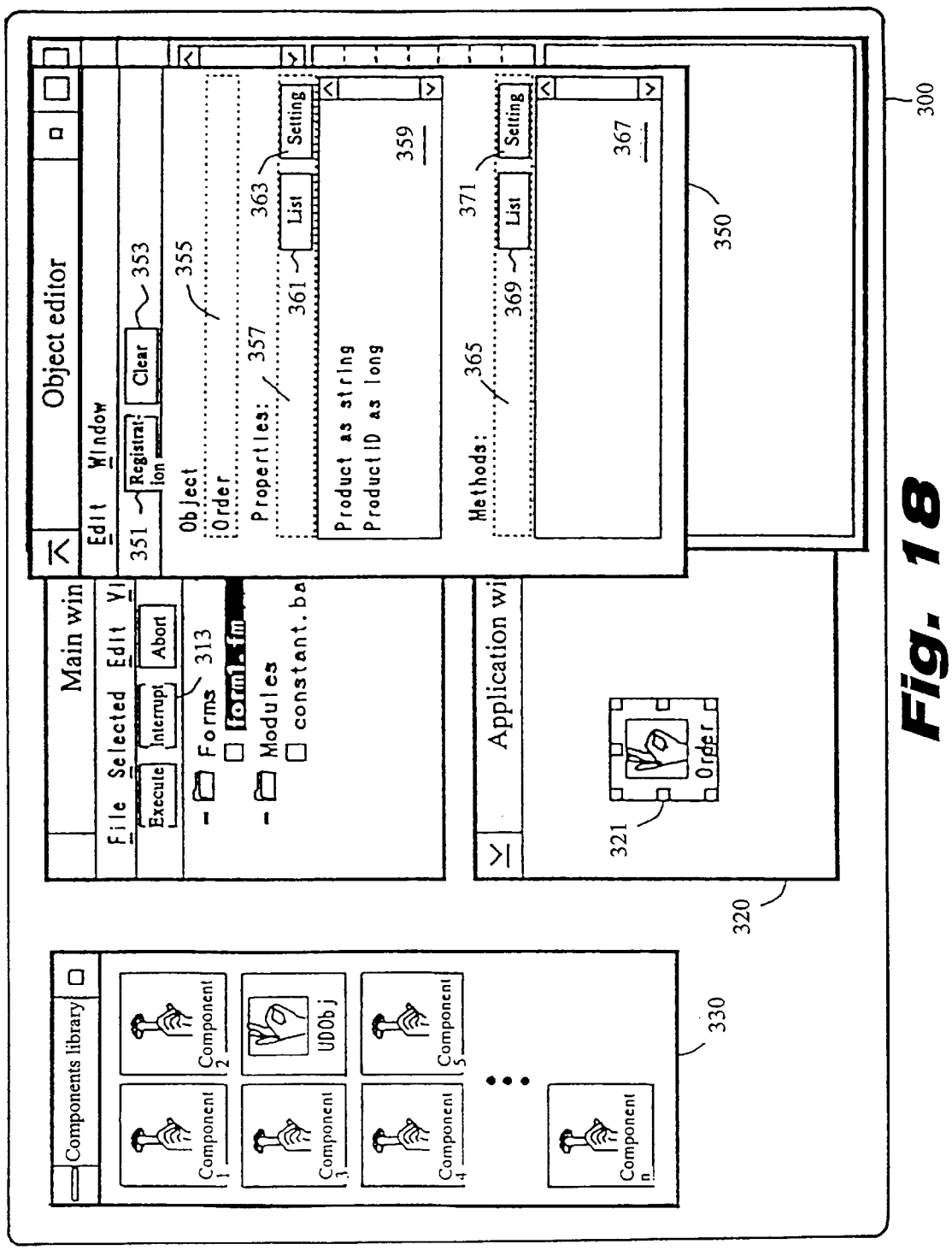
FIG. 18 is a diagram showing a procedure of setting a program component in a preferred embodiment of the present invention.

If the setting of the program component name is completed, then the programmer will perform registration of the property or method. The window 350, displayed in FIG. 18, is an object window and corresponds to the component-information editor shown in FIGS. 2 and 3. In the object window 350 there is shown a program component name 355, so the programmer can easily know that the property or method of the program component "Order" has been defined. In FIG. 518 the registration of the property is first performed. The definition of the property can be performed by inputting the property name and the property type to the property input entry 357 through a keyboard. Also, if a button icon 361, named "List," is selected by a clicking operation, a typical property name and property type will be displayed in the form of a pull-down menu and the programmer can select and utilize one from the list.

The character string, described in the property input entry 357, is registered by clicking on the button icon 363 for registration. If the property is registered, the content of the definition registered in the list 359 of the registered property, will be updated in the object window 350. In the figure, it is shown that the defined sentence of the property, "ProductID as long," has been registered when the property is updated.

If the aforementioned property is registered, the property name 155 and the property type of the property table 150 of the component-information storage 110 will be updated according to the content defined by the user, and information indicating the generic property access function will be set to the entries of the property access functions 157 and 158. Also, a "1," which indicates that the registered property is a user-defined property, is set to the flag 159. Similarly, the property name and the property type of the component-property table 173 are registered in the program component 131. Note that by detecting that the button icon, where the property has been registered, was selected by a clicking operation, it is also possible to again display the property editor window 340 with the content after registration.

Figure 19:
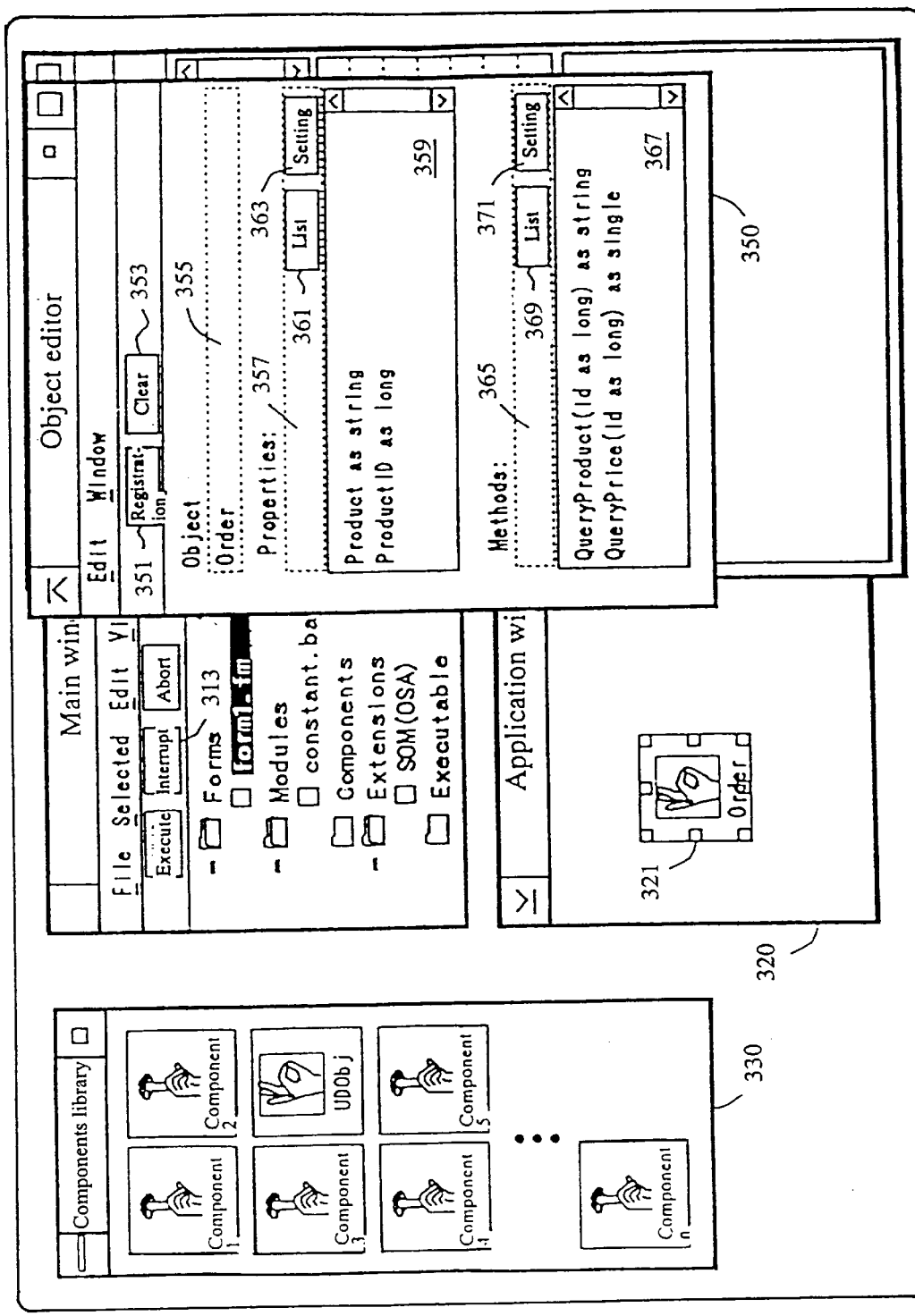
FIG. 19 is a diagram showing a procedure of setting a program component in a preferred embodiment of the present invention.

In FIG. 19, following the registration of the property the registration of the method has been performed. For registrations of the property and the method, either may first be performed. In the present invention, the property will first be described and the method will be described later, for alleviating reader's burden. In the registration of the method, as with the registration of the property, the method name and the method type can be input to the input entry 365 through a keyboard. Also, if the button icon 369 labeled "List" is selected by a clicking operation, a typical method name and method type will be displayed in the form of a pull-down menu and the programmer can select and utilize one from the list.

The character string, described in the method input entry 365, is registered by clicking on the button icon 371 for registration. If the method is registered, the content of the definition registered in the list 367 of the registered method will be added in the object window 350. In the figure it is shown that the defined sentence of the method, "QueryPrice (ID as long) as string," has been registered when the method is updated.

If the aforementioned method is registered, the method name 165 and the method type 168 of the method table 160 of the component-information storage 110 will be updated according to the content defined by the user, and information indicating the generic method function will automatically be set to the entry of the mounting-function address information 167. Also, a "1," which indicates that the registered method is a user-defined method, is set to the flag 169.

D2. Program Generation Procedure

Figure 20:
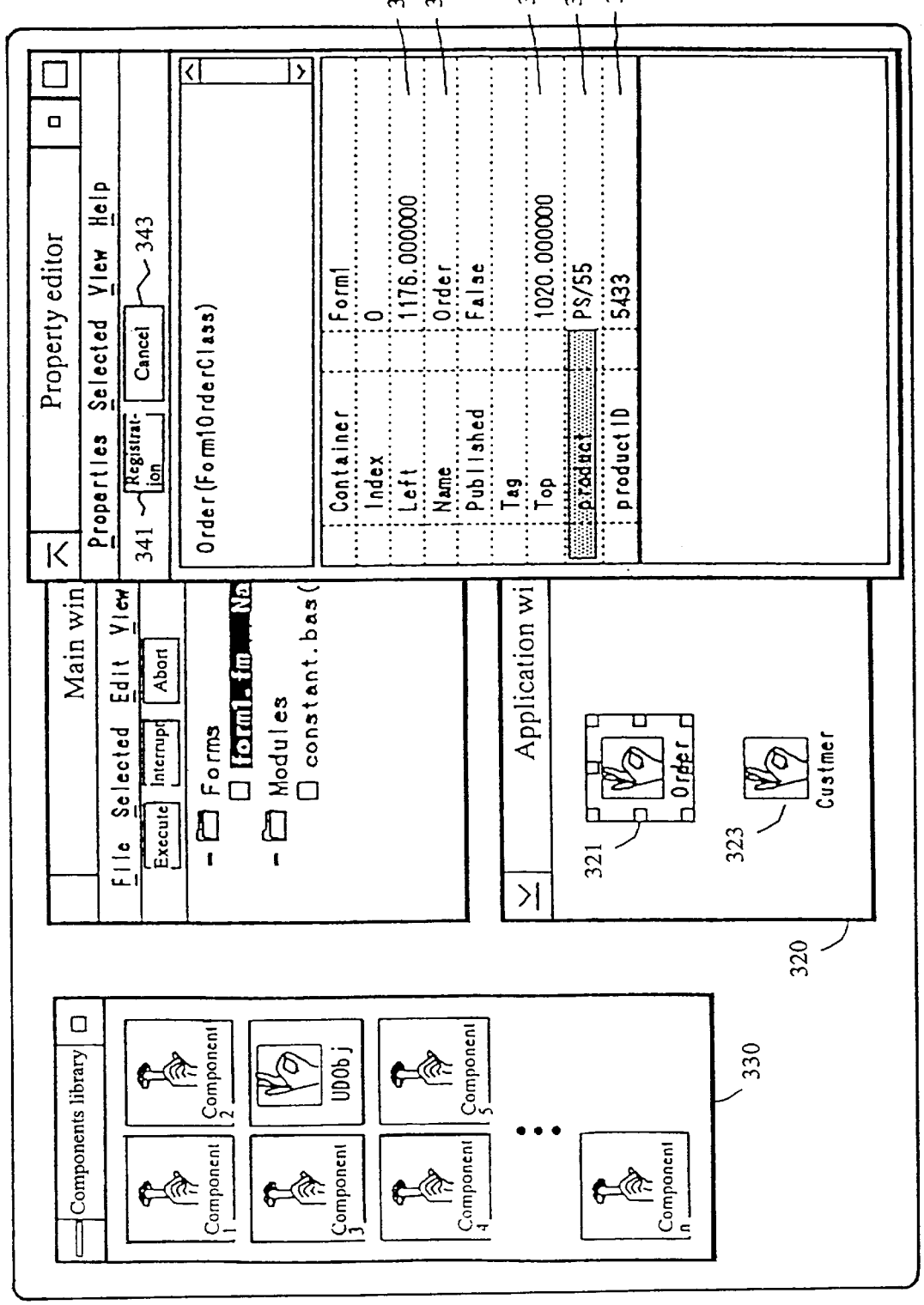
FIG. 20 is a diagram showing a procedure of setting a program component in a preferred embodiment of the present invention.
Figure 21:
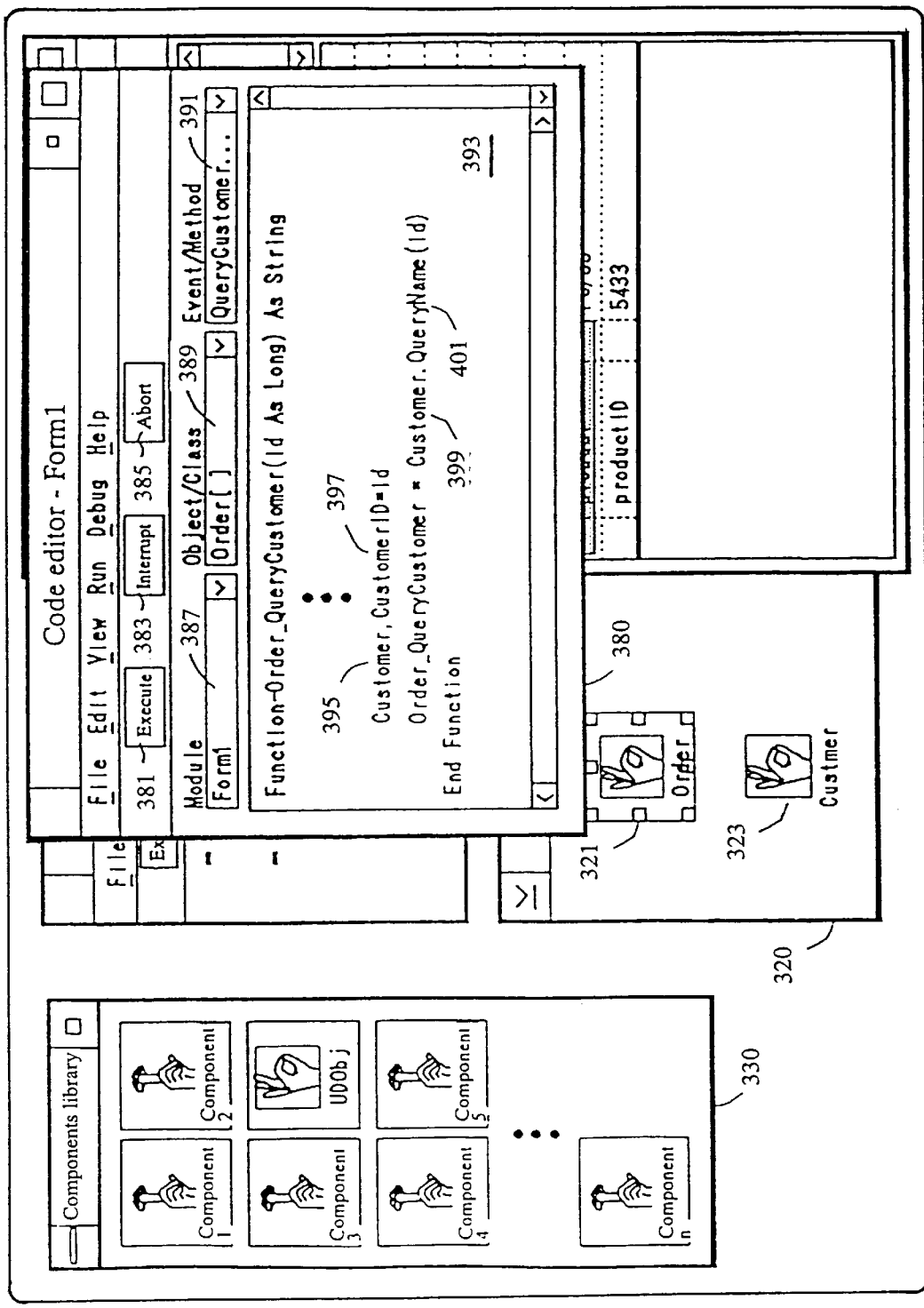
FIG. 21 is a diagram showing a procedure of utilizing a program component in a preferred embodiment of the present invention.

A description will next be made of how the aforementioned information of the user-defined program component is employed by a programmer when a program is developed. FIGS. 20 and 21 are diagrams showing a procedure of utilizing a program component, in a preferred embodiment of the present invention. In FIG. 20 a programmer has set the property value of the user-defined property. Because an entry corresponding to a user-defined property is provided if the property editor window 340 is redisplayed, the programmer can set a property value.

If the redisplay of the property editor window 340 is performed, the builder 100 will all display the property names 155 stored in the property table 150 of the component-information storage 110. Also, in order to display a property value corresponding to this, it is first judged whether the property is an existent property or a used-defined property by checking the flag 159 of the property table 150. In the case of the user-defined property, the judgment can be made because the value of the flag 159 is 1. In this case the programmer has access to the component-property table 173 of the program component 131 by employing the "GetProperty" function 157 of one of the generic property access functions. Then, the property value 179 of the component-property table 173 is displayed on the property editor 103 by retrieving the property name 175 by a key and sending the value to the property editor 103. At this time, a blank will be displayed because there is set no value in the property value of the user-defined property.

Then, the programmer inputs the property value, "PS/55 (trademark of IBM)," to the property name, "Product" 349, and the property value, "5433," to the property name, "ProductID" 352 Next, the builder 100 has access to the property value 179 of the component-property table 173 of the program component 131 by employing the "PutProperty" function 158 among the property names 155 and the generic property access functions stored in the property table 153 of the component-information storage 110 and then updates the property value.

A description will next be made of how information is employed by a programmer when a program is developed in the code editor. In FIG. 21 the programmer is coding a program. The programmer can perform generation of the code of a user-defined method and generation of the code in the main logic section in the code editor window 380. In the figure, reference numeral 380 denotes a code editor window, which corresponds to the code editor in FIGS. 2 and 3. In FIG. 21, a program component name "Order" and the code of the user-defined method of a method name "QueryCustomer" are defined. The content of the code described in the code description entry 393 in the figure is stored in the code storage 109 and is sent to the interpreter 120, in which it is executed as the code of the user-defined method. From the description of the method code the main logic can be described in the same coding technique as a description to use the property and method of another program component. In the code description entry 393, as shown in the figure, the property and method of another program component can also be utilized by specifying the component name 395 or property 397 of the other program component, or by specifying the component name 399 or method name 401 of the other program component while adding arguments.

In the code editor window there are provided three kinds of entries, module entry 387, object entry 389, and method entry 391. By inputting a code directly to these entries through a keyboard, the programmer can specify the component name and method name of the code input to the code description entry. Each of the entries 387, 389, and 391 has the function of a pull-down menu.

The pull-down menu of the module entry 387 is provided for calling out another form (another code edited by the code editor). The form selected by this pull-down menu is displayed on the code description entry 393. The pull-down menu of the object entry 389 is a pull-down menu to retrieve and select another program component. The pull-down menu of the method entry 391 is a pull-down menu for retrieving and selecting another method. if the button icon 381 for execute is selected by a clicking operation, then this code will be sent to the interpreter 120 and executed according to the aforementioned procedure. In addition to the execute button icon 381, button icons 383 and 385 for interrupt and abortpage are provided, and if the icon 383 or 385 is selected by a clicking operation, the execute of a program will be interrupted or aborted.

According to the present invention, as described above, the information about original function of a program component is not only accumulated in the component-information storage but also the information about a new function which is not present in an actual component is accumulated, so other devices or interpreters in the program construction support system can be utilized.

Also, in accordance with the present invention, an apparent function of a program component can be extended in the component-information editor by adding a new property and a new method to the program component.

In addition, the original property of a program component and an additional property can be changed based on the information stored in the component-information storage by the property editor without making a distinction between them.

Furthermore, based on the information stored in the component-information storage, the code of the skeleton of a method can be automatically generated and an additional method can be described by the code editor. Therefore, when an additional method and an additional property are utilized, they can be used without distinguishing them from the original method and property of a program component.

Moreover, when a program component is called out from an interpreter to execute a program, an additional property can be referred to or changed and an additional method can be called out, by using the information stored in the component-information storage.

Since a program component is usually described by languages such as a C language, the addition of a new property and a new method to a certain program component cannot be performed by a basic language differing from the C language and the addition must be performed by the C language. However, if a method of adding property information and method information to a program component of the present invention is employed, a program can be coded with a language easily understandable for users, such as a basic language, and development efficiency can also be enhanced.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A program code executing method in a program development support system which includes a program component which manages method information and property information, a property table which manages a property name and a generic property access function of said program component, a method table which manages a method name and a generic method function of said program component, a code executor, a code storage which includes description of a program component name, a property name, and a method name and which stores a code of a user-defined method stored in relation to a program code which is executed by said code executor and to a method of said program component, and a code editor for editing said code, said program code executing method comprising the steps of:

(a) receiving a program code which includes a description for specifying the program component name, the property name of said program component, and the method name of said program component;

(b) specifying the generic property access function managed in the property table of said component-information storage from the component name and property name included in said program code;

(c) specifying the property value of said program component, based on said program component name and on the generic property access function managed in the property table of said component-information storage;

(d) specifying the generic method function managed in the method table of said component-information storage from the component name and method name included in said program code;

(e) issuing the user-defined method name and the generic method function to said program component;

(f) receiving generic method code access information which points to the code of the user-defined method, issued in response to reception of the user-defined method name and the generic method function performed by the program component;

(g) accessing the code of the user-defined method stored in said code storage, based on said generic method code access information; and (h) executing the code of said user-defined method, wherein said method information included in program components is integrated to extend an apparent function of an existing program component without extending an actual function of the existing program component when an application program is being developed and when said application program is executed.

2. A program code executing method in a program development support system which includes a program component which manages property information, a property table which manages a property name and a generic property access function of said program component, a code executor, a code storage which includes description of a program component name and a property name and which stores a program code which is executed by said code executor, and a code editor for editing said code, said program code executing method comprising the steps of:

(a) receiving a program code which includes a description for specifying the program component name and the property name of said program component;

(b) specifying the generic property access function managed in the property table of said component-information storage from the component name and property name included in said program code; and (c) specifying the property value of said program component, based on said program component name and on the generic property access function managed in the property table of said component-information storage, wherein said property information included in program components is integrated to extend an apparent function functionality of an existing program component without extending an actual function of the existing program component when an application program is being developed and when said application program is executed.

3. A program code executing method in a program development support system which includes a program component which manages method information, a method table which manages a method name and a generic method function of said program component, a code executor, a code storage which includes description of a program component name and a method name and which stores a code of a user-defined method stored in relation to a program code which is executed by said code executor and to a method of said program component, and a code editor for editing said code, said program code executing method comprising the steps of:

(a) receiving a program code which includes a description for specifying the program component name and the method name of said program component;

(b) specifying the generic method function managed in the method table of said component-information storage from the component name and method name included in said program code;

(c) issuing the user-defined method name and the generic method function to said program component;

(d) receiving generic method code access information which points to the code of the user-defined method, issued in response to reception of the user-defined method name and the generic method function performed by the program component;

(e) accessing the code of the user-defined method stored in said code storage, based on said generic method code access information; and (f) executing the code of said user-defined method, wherein said method information included in program components is integrated to extend an apparent function of an existing program component without extending the actual function of the existing program component when an application program is being developed and when said application program is executed.

4. A computer program device readable by a machine, tangibly embodying a program of instructions executable by a machine to perform method steps for storing a program to execute a program code, in a program development support system which includes a program component which manages method information and property information, a property table which manages a property name and a generic property access function of said program component, a method table which manages a method name and a generic method function of said program component, a code executor, a code storage which includes description of a program component name, a property name, and a method name and which stores a code of a user-defined method stored in relation to a program code which is executed by said code executor and to a method of said program component, and a code editor for editing said code, the program comprising:

(a) program code means for instructing said program development support system to receive a program code which includes a description for specifying the program component name, the property name of said program component, and the method name of said program component;

(b) program code means for instructing said program development support system to specify the generic property access function managed in the property table of said component-information storage from the component name and property name included in said program code;

(c) program code means for instructing said program development support system to specify the property value of said program component, based on said program component name and on the generic property access function managed in the property table of said component-information storage;

(d) program code means for instructing said program development support system to specify the generic method function managed in the method table of said component-information storage from the component name and method name included in said program code;

(e) program code means for instructing said program development support system to issue the user-defined method name and the generic method function to said program component;

(f) program code means for instructing said program development support system to receive generic method code access information which points to the code of the user-defined method, issued in response to reception of the user-defined method name and the generic method function performed by the program component;

(g) program code means for instructing said program development support system to access the code of the user-defined method stored in said code storage, based on said generic method code access information; and (h) program code means for instructing said program development support system to execute the code of said user-defined method, wherein said property and method information included in program components are integrated to extend an apparent function of an existing program component without extending an actual function of the existing program component when an application program is being developed and when said application program is executed.

* * * * *

UNITED STATES PATENT AND TRADEMARK OFFICE
CERTIFICATE OF CORRECTION

PATENT NO. : 6,182,278 B1
DATED : January 30, 2001
INVENTOR(S) : S. Hamada, et al.

It is certified that error appears in the above-identified patent and that said Letters Patent is hereby corrected as shown below:

Title page,
Item [56], under "OTHER PUBLICATIONS", Column 2, line 12, "1995.12" should read -- 1995. --

Column 10,
Line 29, "on" should read -- On --

Column 12,
Line 46, "table" should read -- table" --

Column 20,
Line 66, after "352" insert -- . --

Column 21,
Line 40, "if the..." should begin a new paragraph and read -- If the... --

Signed and Sealed this

Eleventh Day of December, 2001

*Attest:*

NICHOLAS P. GODICI
*Attesting Officer*     *Acting Director of the United States Patent and Trademark Office*